United States Patent
Matsumoto

(10) Patent No.: US 10,153,827 B2
(45) Date of Patent: Dec. 11, 2018

(54) COMMUNICATION APPARATUS AND DATA RELAY METHOD

(71) Applicant: FUJITSU LIMITED, Kawasaki-shi, Kanagawa (JP)

(72) Inventor: Yuji Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 177 days.

(21) Appl. No.: 15/005,207

(22) Filed: Jan. 25, 2016

(65) Prior Publication Data

US 2016/0218794 A1 Jul. 28, 2016

(30) Foreign Application Priority Data

Jan. 27, 2015 (JP) .................................. 2015-013238

(51) Int. Cl.
*H04B 7/155* (2006.01)
*H04L 1/16* (2006.01)
*H04L 1/18* (2006.01)

(52) U.S. Cl.
CPC ....... *H04B 7/15521* (2013.01); *H04L 1/1685* (2013.01); *H04L 1/1848* (2013.01)

(58) Field of Classification Search
None
See application file for complete search history.

(56) References Cited

U.S. PATENT DOCUMENTS

| | | | | |
|---|---|---|---|---|
| 5,734,654 A * | 3/1998 | Shirai | ................... | H04L 49/205 370/396 |
| 7,706,255 B1 * | 4/2010 | Kondrat | ................... | H04L 47/10 370/219 |
| 9,450,867 B2 * | 9/2016 | Oguchi | ................. | H04L 69/169 |
| 2004/0208123 A1 * | 10/2004 | Sakata | .................... | H04L 47/10 370/232 |
| 2006/0221825 A1 * | 10/2006 | Okano | ................. | H04L 1/1874 370/229 |
| 2009/0262748 A1 * | 10/2009 | Nakagawa | .......... | H04L 12/4641 370/412 |
| 2013/0281098 A1 | 10/2013 | Fujii et al. | | |
| 2014/0328182 A1 * | 11/2014 | Gao | ..................... | H04W 28/08 370/236 |

(Continued)

FOREIGN PATENT DOCUMENTS

| | | |
|---|---|---|
| EP | 2456140 | 5/2012 |
| JP | 2001-060956 | 3/2001 |

(Continued)

OTHER PUBLICATIONS

JPOA—Office Action dated Sep. 18, 2018 issued in the corresponding Japanese application No. 2015-013238, with full English translation of the Office Action.

*Primary Examiner* — Donald L Mills
(74) *Attorney, Agent, or Firm* — Fujitsu Patent Center

(57) ABSTRACT

A communication apparatus includes a memory that stores data transmitted using a protocol that a transmission source receives a response indicating a reception status of data and transmits or retransmits the data based on the response, a transmitter that transfers the data stored in the memory to a transfer destination, and a controller that inhibits transmission of the response transmitted to the transmission source when a value pertaining to the data transfer to the transfer destination becomes a given range.

10 Claims, 20 Drawing Sheets

(56) References Cited

U.S. PATENT DOCUMENTS

2015/0163149 A1* 6/2015 Norlander ............... H04L 47/24
370/392
2015/0172198 A1* 6/2015 Levy ....................... H04L 47/24
370/232

FOREIGN PATENT DOCUMENTS

| JP | 2001-156877 | 6/2001 |
| JP | 2003-124984 | 4/2003 |
| JP | 2005-520436 | 7/2005 |
| JP | 2012-109975 | 6/2012 |
| JP | 2013-223174 | 10/2013 |
| WO | 03/079616 | 9/2003 |

* cited by examiner

FIG. 9

<CONTROL MODE>

MODE 1 (DESIGNATION OF CONTROL TARGET)
-TARGER ASSOCIATION NUMBER

MODE 2 (DESIGNATION OF CONTROL METHOD IN SACK CONTROL)
-DISCARD OF SACK
-STOP OF SACK TRANSMISSION
-DISCATD OF SACK WITHIN DESIGNATION TIME OF PERIOD
-DISCARD OF DATA

MODE 3 (DESIGNATION OF CONTROL METHOD IN SACK CONTROL)
-STOP OF UPDATE OF RECEPTION SEQUENCE (STOP OF SACK TRANSMISSION)

MODE 4 (ESTABLISHMENT OF INDEPENDENT COMMUNICATION PATH)
-NEW GENERATION OF SCTP ASSOCIATION
-NEW GENERATION OF SCTP STREAM

MODE 5 (NOTIFICATION OF PERFORMANCE INFORMATION, STATISTICAL INFORMATION, LIMIT INFORMATION)
-NOTIFICATION OF MESUREMENT VALUE INFORMATION
-NOTIFICATION OF BUFFER SIZE ALLOCATABLE TO SCTP ASSOCIATION

: :

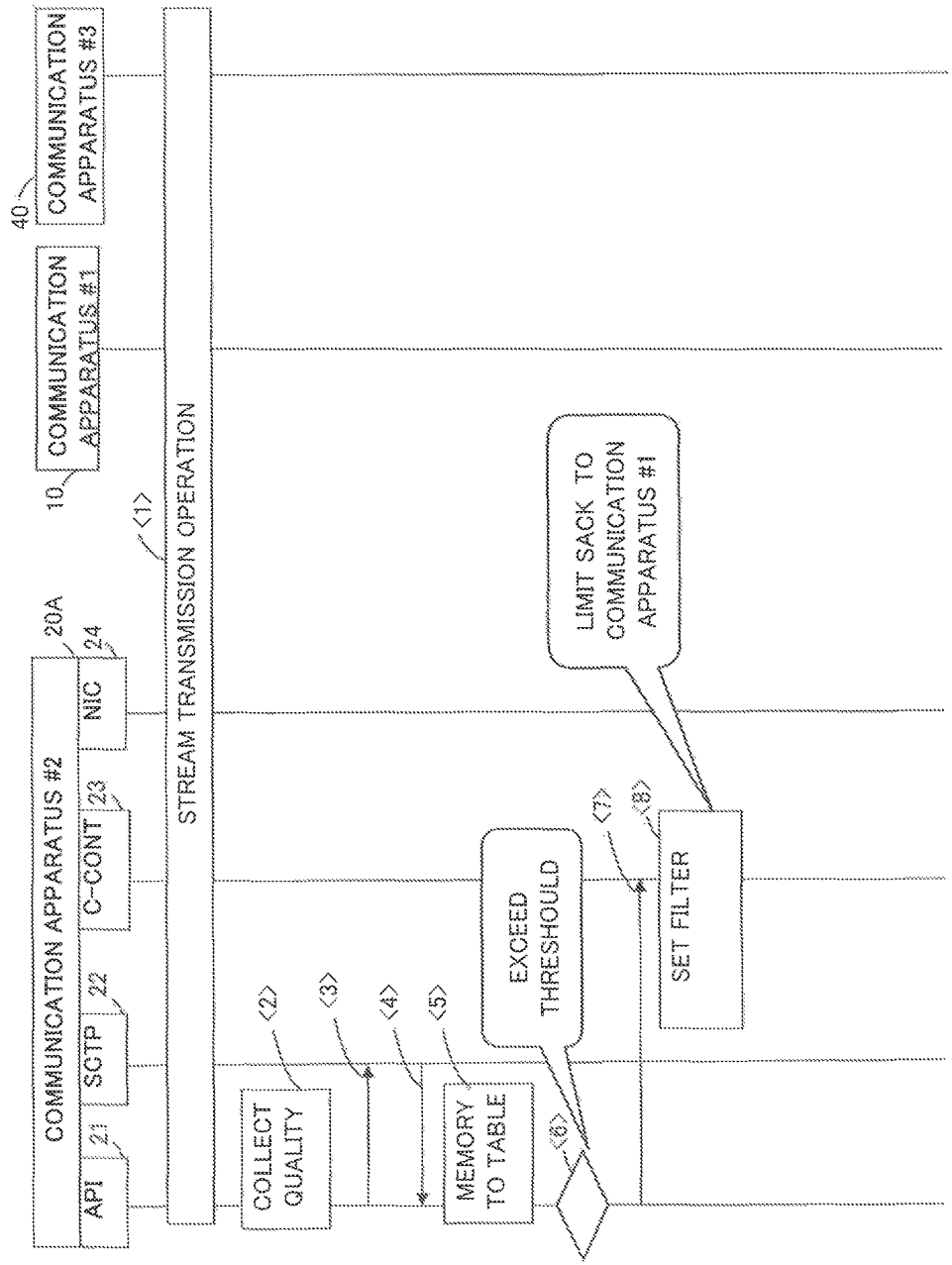

FIG. 14

SCTP DATA CHUNK

| 0 1 2 3 4 5 6 7 | 8 9 10 11 12 13 14 15 | 16 17 18 19 20 21 22 23 24 25 26 27 28 29 30 31 |
|---|---|---|
| Type=0 | Reserved U B E | Length |
| TSN |||
| Stream Identifier S | | Stream Sequence Number n |
| Payload Protocol Identifier |||
| User Data(Seq n of Steram S) |||

FIG. 15

SCTP SACK CHUNK

| 0 1 2 3 4 5 6 7 | 8 9 10 11 12 13 14 15 | 16 17 18 19 20 21 22 23 24 25 26 27 28 29 30 31 |
|---|---|---|
| Type=3 | Chunk Flags | Length |
| Cumulative TSN Ack |||
| Advertised Receiver Window Credit(a_rwnd) |||
| Number of Gap Ack Blocks =N | | Number of Duplicate TSNs=X |
| Gap Ack Block #1 Start | | Gap Ack Block #1 End |
| ... |||
| Gap Ack Block #N Start | | Gap Ack Block #N End |
| Duplicate TSN#1 |||
| ... |||
| Duplicate TSN#X |||

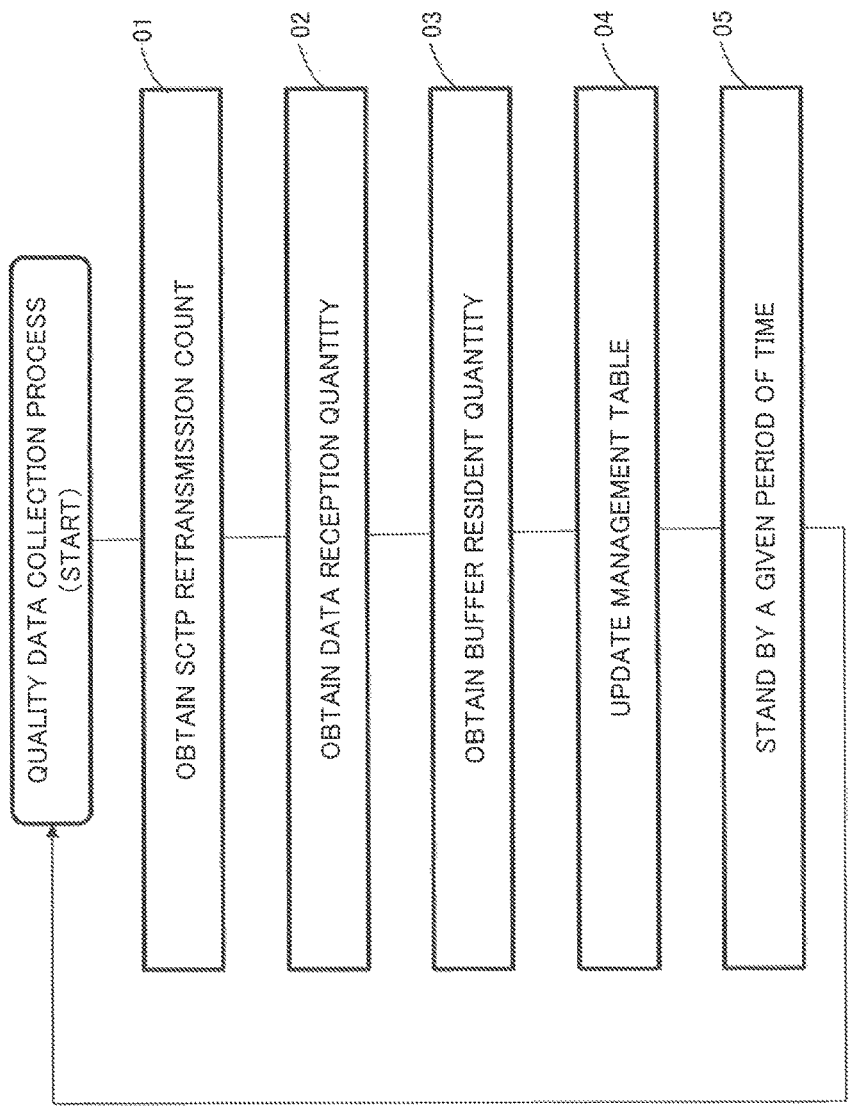

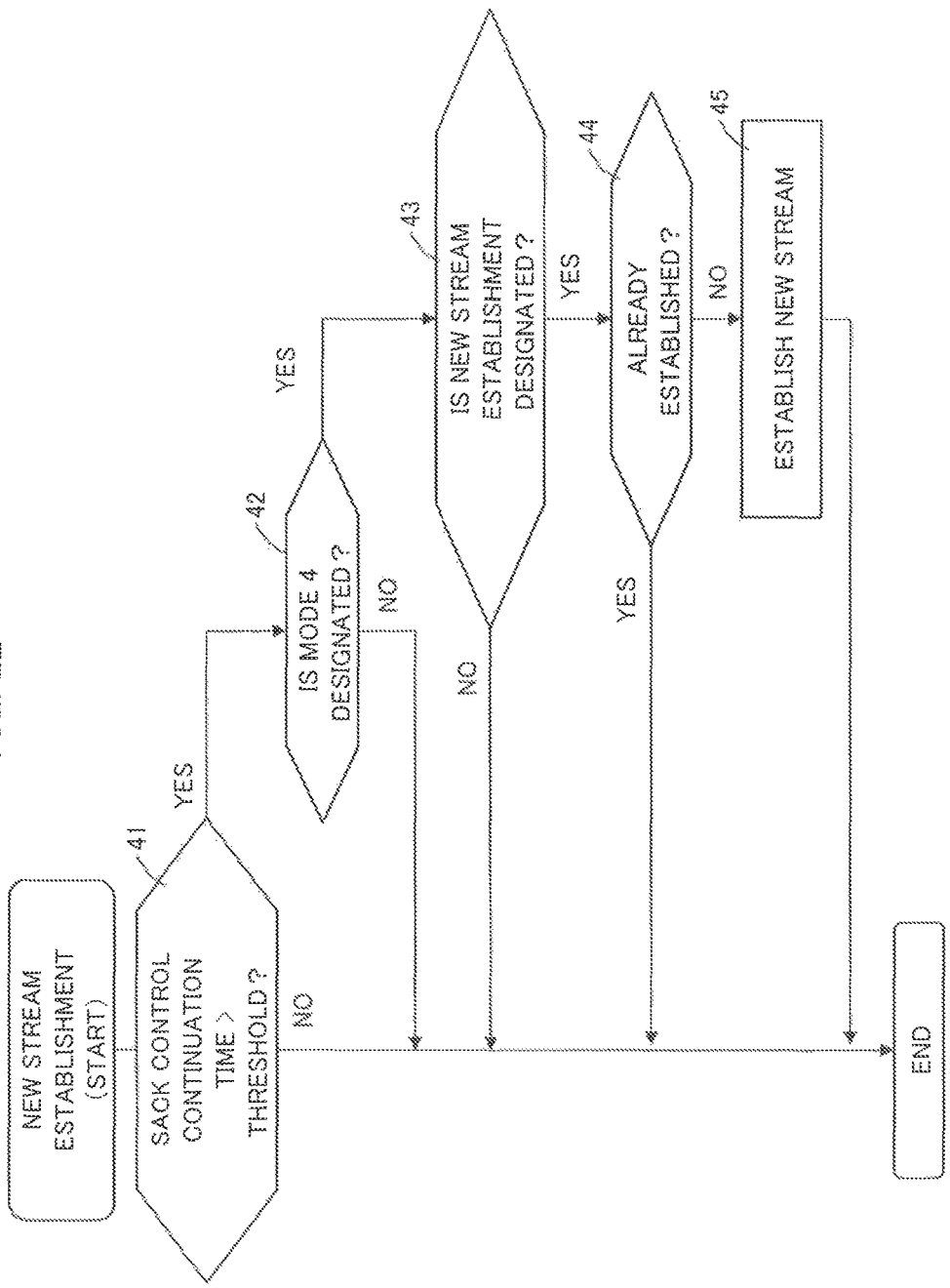

COMMUNICATION APPARATUS AND DATA RELAY METHOD

CROSS-REFERENCE TO RELATED APPLICATION

This application is based upon and claims the benefit of priority of the prior Japanese Application No. 2015-013238 filed on Jan. 27, 2015, the entire contents of which are incorporated herein by reference.

FIELD

The present disclosure pertains to a communication apparatus and a data relay method.

BACKGROUND

A third generation mobile communication system (3G) standardized by Third Generation Partnership Project (3GPP) includes a base station and a Radio Network Controller (RNC) that controls the base station as a host apparatus of the base station in a radio network. Stream Control Transmission Protocol (SCTP) is used as one of protocols for controlling communications between the base station and the RNC. Third generation (3G) mobile communication standards include Long Term Evolution (LTE) and LTE-A (LTE-Advanced) as improved version of the LTE. In the LTE and the LTE-A, SCTP-based communications are performed between the base station and Mobility Management Entity (MME) as a host apparatus of the base station.

For example, a given base station establishes a communication path (called a connection or a session) based on the SCTP with the host apparatus, and receives data from the host apparatus via the communication path. On the other hand, the base station establishes an SCTP-based communication path with another base station, and transfers the data received from the host apparatus via this communication path. According to a terminology of the SCTP, the communication path is called an "association".

According to the SCTP, the communications are performed on an exchange unit called a "chunk", and an arrival sequence of the chunks containing transmission target data (which are called DATA chunks) is guaranteed between the transmission and the reception. Therefore, e.g., a data reception side transmits a SACK (Selective Acknowledgement) chunk, indicating that the data is successfully received, back to a data transmission side. The transmission side refers to a content of the SACK chunk, and retransmits the data not yet arriving at the reception side.

For further information, see Japanese Laid-Open Patent Publication No. 2012-109975. Japanese National Publication of International Patent Application No. 2005-520436.

The base station described above operates as a relay apparatus to relay the data between the host apparatus and another base station, in which case it may happen that a communication environment between the base station and another base station is lower in quality than a communication environment between the base station and host apparatus. For example, a band usable for the communications via the association between the base station and another base station is narrower than a band usable for the communications via the association between the host apparatus and the base station as the case may be.

In this case, such a problem arises as to cause an increase in capacity of a memory used for the base station to store transfer target data given from the host apparatus in order to absorb a difference an quantity of data received from the host apparatus per unit time and a quantity of data that can be transmitted to another base station per unit time. The data stored in the memory cannot be deleted from the memory unless the reception of the data from another base station is permitted through the SACK chunk in preparation for a retransmission request given from another base station. Consequently, under a condition having a poor communication quality between the base station and another base station and having frequent retransmissions of the data, the base station continues storing the data in the memory in preparation for the data retransmission. The memory capacity held by the base station further increases when taking such a case into consideration.

SUMMARY one of aspects is a communication apparatus. The communication apparatus includes a memory that stores data transmitted using a protocol that a transmission source receives a response indicating a reception status of data and transmits or retransmits the data based on the response, a transmitter that transfers the data stored in the memory to a transfer destination, and a controller that inhibits transmission of the response transmitted to the transmission source when a value pertaining to the data transfer to the transfer destination becomes a given range.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 9 is an explanatory diagram of a control mode to be registered in the management table;

FIG. 10 is a sequence diagram illustrating an operational example of the communication system (FIG. 5) according to the embodiment;

FIG. 14 is a diagram illustrating a data structure of an SCTP DATA chunk;

FIG. 15 is a diagram illustrating a data structure of an SCTP SACK chunk;

FIG. 16 is a flowchart illustrating an example of a process of collecting quality data;

FIG. 22 is a flowchart illustrating a processing example of generating a new stream.

DETAILED DESCRIPTION OF EMBODIMENT

An embodiment will hereinafter be described with reference to the drawings. A configuration of the embodiment is an exemplification, and the present invention is not limited to the configuration of the embodiment.

[Reference Example]

Figure 1:
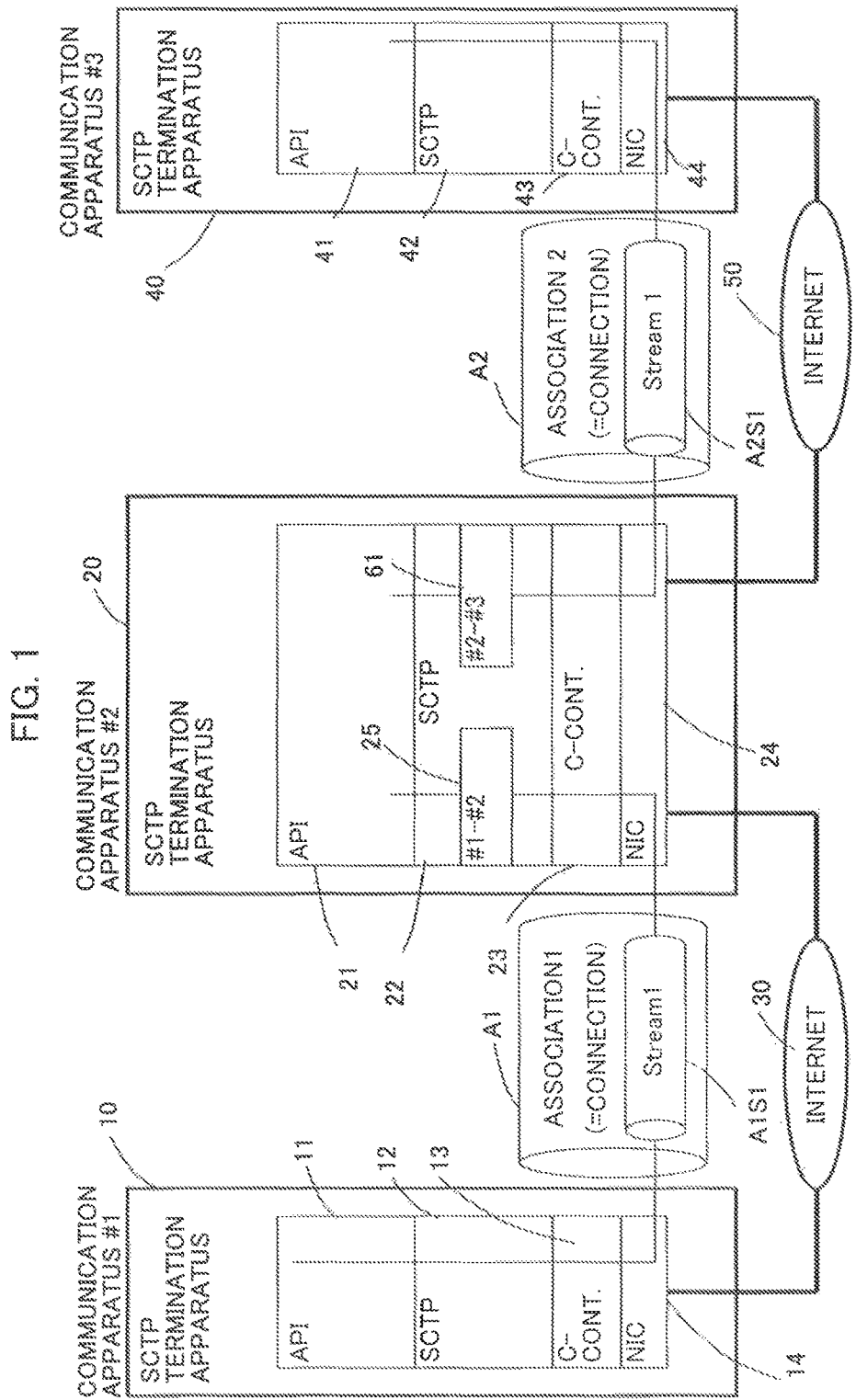
FIG. 1 is a diagram illustrating a communication system according to a reference example.
Figure 2:
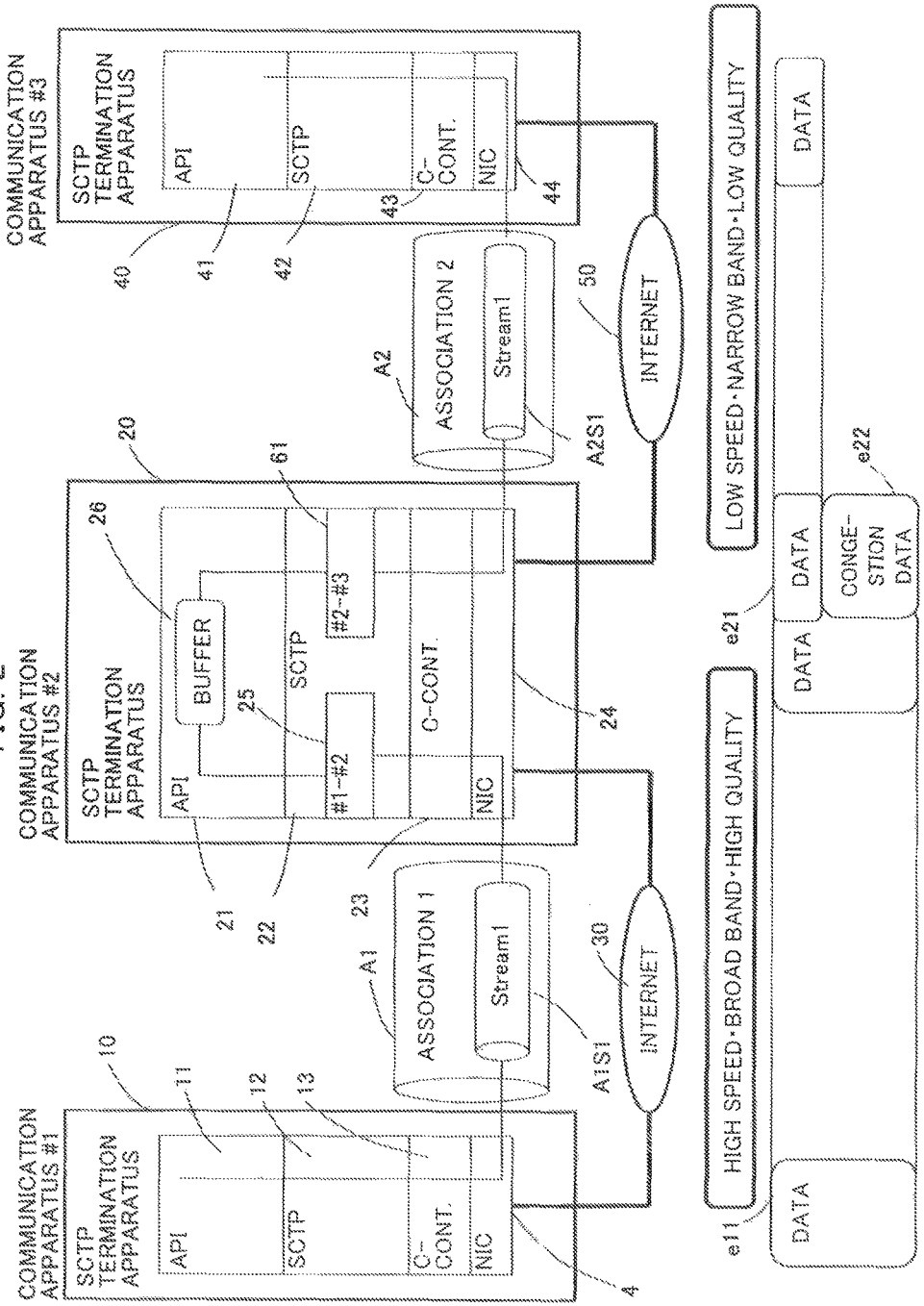
FIG. 2 is a diagram illustrating another communication system according to the reference example.

The description will start with a reference example. FIGS. 1 and 2 are diagrams each illustrating a communication system relating to the reference example. FIG. 1 illustrates an example of the communication system configured such that a communication apparatus #2 operates as a relay apparatus to relay data given from a communication apparatus #1 to a communication apparatus #3, based on Stream Control Transmission Protocol (SCTP). The SCTP is one example of a "protocol that a transmission source receives a response (e.g., Selective ACKnowledgement: SACK) indicating a reception status of data and transmits or retransmits the data based on the response".

In FIG. 1, the communication apparatus #1 including an SCTP termination apparatus 10 and a communication apparatus #2 including an SCTP termination apparatus 20 are interconnected via the Internet 30. The communication apparatus #2 is connected to the communication apparatus #3 including an SCTP termination apparatus 40 via the Internet 30. The communication apparatus #1 is a host apparatus instanced by a Radio Network Controller (RNC) or a Mobility Management Entity (MME), while the communication apparatuses #2 and #3 are radio communication apparatuses instanced by base stations.

The SCTP termination apparatus 10 includes an application interface (API) 11 to control communications with the communication apparatus #2, and an SCTP processing unit 12 to perform the communications with the communication apparatus #2. The SCTP termination apparatus 10 further includes a communication controller (C-CONT.) 13 to manage transmitting and receiving messages and signals between the SCTP processing unit 12 and the outside, and a network interface card (NIC) 14 to execute a transmission process and a reception process with a network.

The SCTP termination apparatus 20 includes an API 21, an SCTP processing unit 22, a communication control unit 23 and a NIC 24, which have the same functions as those of the API 11, the SCTP processing unit 12, the communication controller 13 and the NIC 14. The SCTP termination apparatus 40 also includes an API 31, an SCTP processing unit 32, a communication controller 33 and a NIC 34, which have the same functions as those of the API 11, the SCTP processing unit 12, the communication controller 13 and the NIC 14.

The SCTP termination apparatus 10 sets a connection (session) called an "association" with the SCTP termination apparatus 10 when the communication apparatus #1 communicates with the communication apparatus #2. The association is also called an SCTP link. A plurality of logical channels called "streams" maybe set in the association. Data to be transferred via the association is transferred by using any one of the streams generated within the association. The association is one example of a "connection" and the stream is one example of a "channel".

The association is established by a procedure called SCTP association initialization. The SCTP association initialization (which will hereinafter be simply termed "association initialization").is carried out by transmitting and receiving an INIT chunk (INITiation chunk), an INIT ACK (ACKnowledgement) chunk, an SCTP Cookie ECHO chunk and an SCTP Cookie ACK chunk between a sender apparatus and a recipient apparatus. The SCTP association initialization is called "4 way handshakes" in some cases. After completing the association initialization, the data becomes a data transmission enabled status via the association.

The communication apparatus #1 carries out the association initialization with the communication apparatus #2, thereby establishing an SCTP based connection (association 1 (association A1)) between the SCTP termination apparatus 10 and the SCTP termination apparatus 20 (via the Internet 30). The communication apparatus #1 transmits the data to the communication apparatus #2 by using the stream 1 (stream A1S1) generated in the association A1

The communication apparatus #2 transfers, based on the SCTP, the data to the communication apparatus #3. In this case, the SCTP termination apparatus 20 and the SCTP termination apparatus 40 perform the SCTP association initialization, thereby establishing an association 2 (association A2)) between the SCTP termination apparatus 20 and the SCTP termination apparatus 40 (on the Internet 50). The communication apparatus #2 transmits the data to the communication apparatus #3 via the stream 1 (stream A2S1) provided in the association A2. In the communication apparatus #2, the association A1 (stream A1S1) is associated with the association A2 (stream A2S1) to control the transfer.

As depicted in FIG. 2, an assumption is that an environment of the SCTP based communications between the communication apparatus #1 (the SCTP termination apparatus 10) and the communication apparatus #2 (SCTP termination apparatus 20 has a high speed, a broadband and a high quality. This is an evaluation in a comparison with an environment of the SCTP based communications between the communication apparatus #2 (the SCTP termination apparatus 20) and the communication apparatus #3 (the SCTP termination apparatus 40). In other words, the communication environment between the communication apparatus #2 and the communication apparatus #3 is assumed to be lower in speed, narrower in band and lower in quality than the communication environment between the communication apparatus #1 and the communication apparatus #2.

The following operation is conducted based on the assumption described above when the SCTP termination apparatus 20 receives the data from the SCTP termination apparatus 10, and transfers the data to the SCTP termination apparatus 40.

The data transmitted from the SCTP termination apparatus 10 is processed in a process 25 by the SCTP processing unit 22 of the SCTP termination apparatus 20 and is stored in a memory (also referred to as a buffer), the process 25 pertaining (relating) to the communications between the communication apparatus #1 and the communication apparatus #2. The data stored in the memory 26 is processed in a process 61 by the SCTP processing unit 22 and transmitted to the communication apparatus #3 (the SCTP termination apparatus 40), the process 61 pertaining (relating) to the communications between the communication apparatus #2 and the communication apparatus #3.

In FIG. 2, "e11" represents SCTP-based transmission enabled data per unit time to the communication apparatus #2 from the communication apparatus #1. The data e11 is stored in the memory 26. On the other hand, the communication environment between the communication apparatus #2 and the communication apparatus #3 is lower in speed, narrower in band and lower in quality than the communication environment between the communication apparatus #1 and the communication apparatus #2. The data e11 is larger than an SCTP-based transmission enabled data size designated by "e21" per unit time to the communication apparatus #3 from the communication apparatus #2. Remaining data given by subtracting the data e21 from the data e11 becomes resident data e22. In other words, the memory 26 has a capacity enabling storage of the resident data e22.

Figure 3:
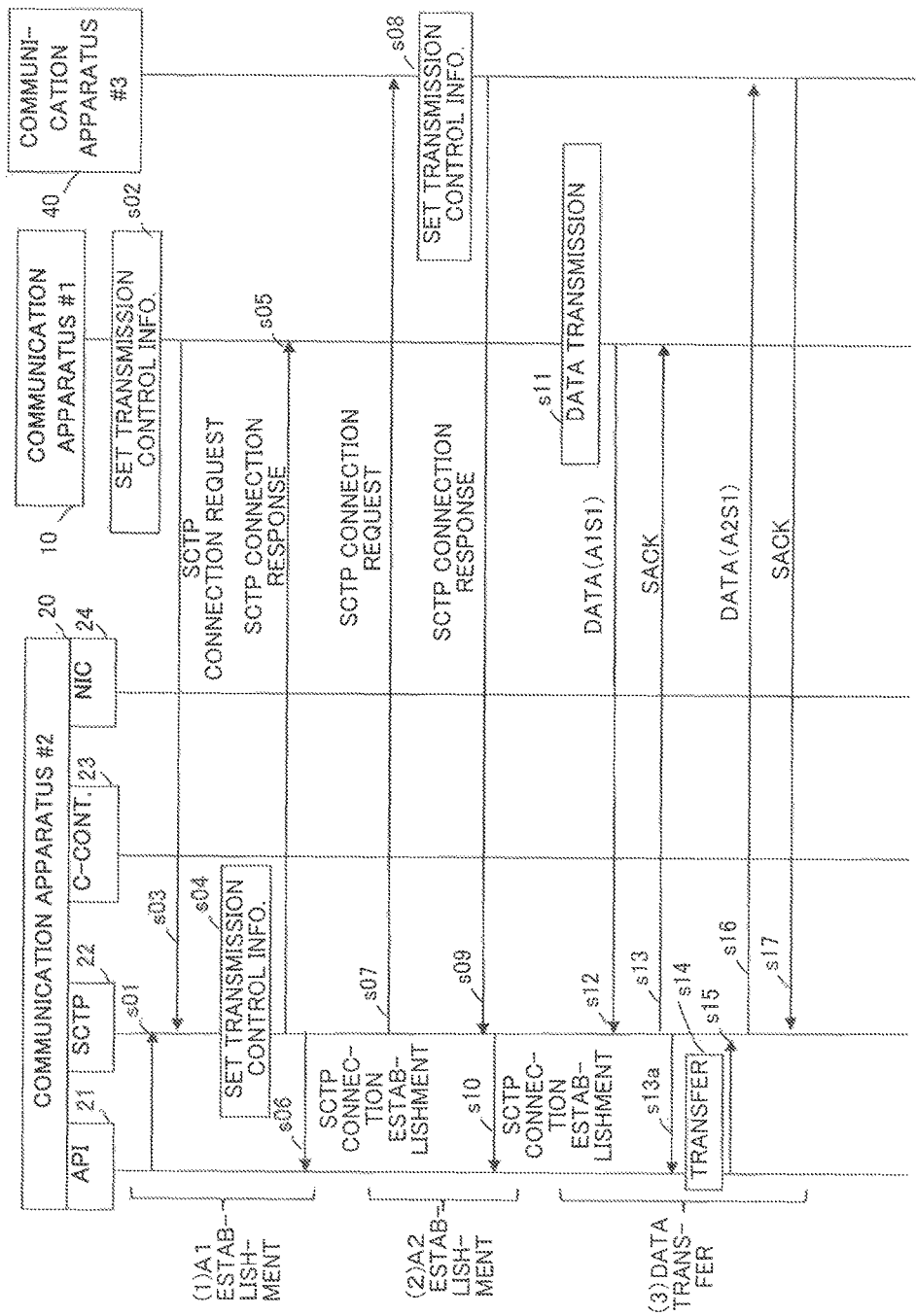
FIG. 3 is a diagram illustrating one example of how an SCTP-based association is established and data is transferred.

FIG. 3 is a diagram illustrating one example of how the SCTP association is established and how the data is transferred. FIG. 3 illustrates an example that the SCTP termination apparatus 20 acting as an SCTP server connects to the SCTP termination apparatus 10.

In FIG. 3, an API 21 of the SCTP termination apparatus 20 performs an SCTP connection wait setting with respect to the SCTP processing unit 22 (s01). Next, the transmission control is executed in the SCTP termination apparatus 10 (s02). To be specific, the SCTP processing unit 12 of the SCTP termination apparatus 10 transmits an SCTP connection request (INIT chunk) to the SCTP termination apparatus 20 (the SCTP processing unit 22) (s03). In the communication apparatus #2, the SCTP processing unit 22 receives the SCTP connection request via the NIC 24 and the communication control unit (communication controller: C-CONT.) 23. The SCTP association initialization is thereby started.

The SCTP processing unit 22 sets transmission control information through the SCTP association initialization (s04). Upon establishing the association A1, the SCTP processing unit 22 transmits an SCTP connection response (INIT ACK chunk) to the SCTP termination apparatus 10 (the SCTP processing unit 12) (s05). Note that the actual association initialization involves, as described above, further transmitting a receiving the SCTP Cookie ECHO chunk and the SCTP Cookie ACK chunk, and FIG. 3, however, omits the illustration thereof.

Upon the initialization of the association A1, the SCTP processing unit 22 notifies the API 21 that the association A1 has been established (s06). Subsequently, the SCTP processing unit 22 executes a procedure of establishing an association A2. Specifically, the SCTP processing unit 22 transmits the SCTP connection request (INIT chunk) to the communication apparatus #3 (the SCTP processing unit 42 of the SCTP termination apparatus 40) (s07).

The SCTP processing unit 42, upon receiving the SCTP connection request, starts the SCTP association initialization, and sets the transmission control information (s08). When the association A2 is established, the SCTP processing unit 42 transmits the SCTP connection response (INIT ACK chunk) to the SCTP termination apparatus 20 (the SCTP processing unit 22) (s09). The SCTP processing unit 22, upon receiving the SCTP connection response, notifies the API 21 that the association A2 has been established (s10). The API 21 registers the association A1 (stream A1S1) and the association A2 (stream A2S1) to be associated with each other for the data transfer.

Thereafter, the SCTP processing unit 12 determines the transmission via the stream A1S1 of the association A1 (s11), and transmits the data via the stream A1S1 (s12). The SCTP processing unit 22, upon receiving the data, notifies the communication apparatus #1 (the SCTP processing unit 12) of the data reception by transmitting a SACK chunk (s13). The data is stored in the memory 26. The SACK chunk transmitted by the SCTP processing unit 22 to notify the API of the data reception (s13a) is one example of a "response".

The API 21, when determining based on the information associated with the association (stream) that the data is a target to be transferred to the stream A1S1 (s14), instructs the SCTP processing unit 22 to transfer the data (s15). The SCTP processing unit 22 transfers the data to the communication apparatus #3 via the stream A2S1 of the association A2 (s16). The SCTP processing unit 22, when the communication apparatus #3 (the SCTP termination apparatus 40) normally receives the data, receives the SACK chunk indicating the normal reception (s17).

Figure 4:
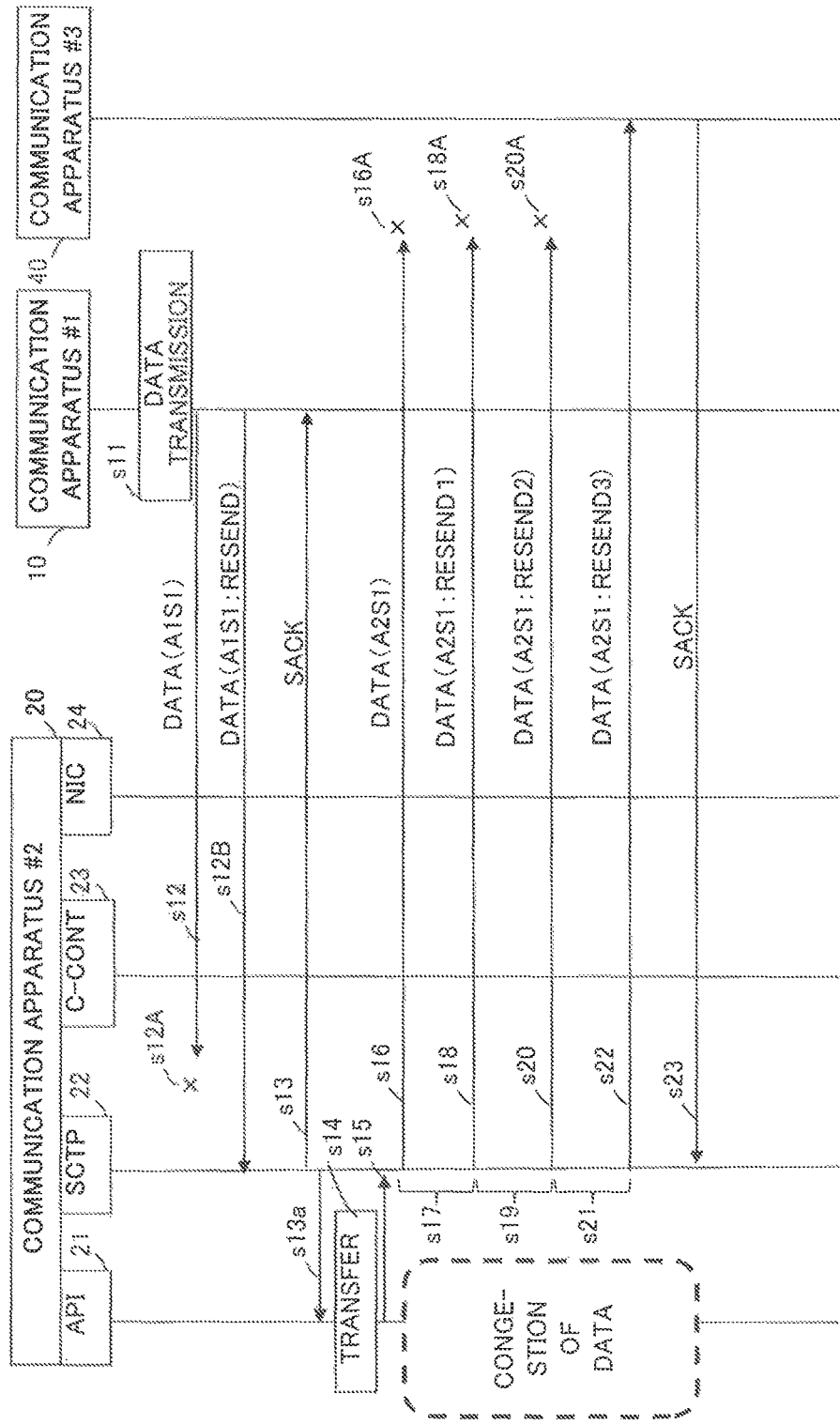
FIG. 4 is a diagram illustrating a problem pertaining to data retransmission in the data transfer as depicted in FIG. 3.

FIG. 4 is a diagram illustrating a problem pertaining to retransmission of the data in the data transfer as depicted in FIG. 3. The communication apparatus #1 executes a data transmission process in s11 of FIG. 4, thereby transmitting the data via the stream A1S1 (s12). It is here at assumed that the data is missed without being received by the communication apparatus #2 (s12A). The SCTP processing unit 12 of the communication apparatus #1, when transmitting the data, comes to a status of standing by for the SACK chunk indicating the data reception. When not receiving the SACK chunk during the standby for a predetermined period of time, the SCTP processing unit 12 waits till reaching retry time, and then retransmits the data (s12B). When the communication apparatus #2 normally receives the retransmitted data, the SCTP processing unit 22 notifies the SCTP processing unit 12 through the SACK chunk (s13). The SCTP processing unit 22 also notifies the API 21 of the data reception (s13a).

The processes in S14, S15, S16 of FIG. 4 are the same as those in s14, s15, s16 of FIG. 3. In FIG. 4, however, such a case is assumed that the data transmitted in s16 is not received by the communication apparatus #3 but is missed (s16A). A reason to be considered is that the communication environment between the communication apparatus #2 and the communication apparatus #3 is, as described in FIG. 2, worse than the communication environment between the communication apparatus #1 and the communication apparatus #2.

In this case, the SCTP processing unit 22 stands by for the SACK chunk indicating the data reception from the communication apparatus #3 (s17). However, when not receiving the SACK chunk for the predetermined period of time, the SCTP processing unit 22 retransmits the data (s18). The SACK chunk in response to the retransmitted data cannot be received, in which case the retransmission is iterated (s18A, s19, s19A, s20, s20A, s21, s22).

When the communication apparatus #3 normally receives the data retransmitted in s22, the SCTP processing unit 22 receives the SACK chunk indicating the data reception (s23). In the meantime, the communication apparatus #1 continues transmitting the data as far as the memory 26 has a free space. On the other hand, the SCTP processing unit 22 executes, based on the SCTP, transferring the data to the communication apparatus #3 in a strict data transmission sequence. The memory (buffer) 26 therefore continues retaining the data during the iteration of the data retransmission.

Accordingly, in the reference example, the memory 26 has an increased capacity in preparation for retransmitting the data to the transfer destination. The following embodiment will discuss a communication system that can restrain a quantity of the resident data in the memory 26, thereby enabling a reduction of the capacity of the memory 26.

[Embodiment]

Figure 5:
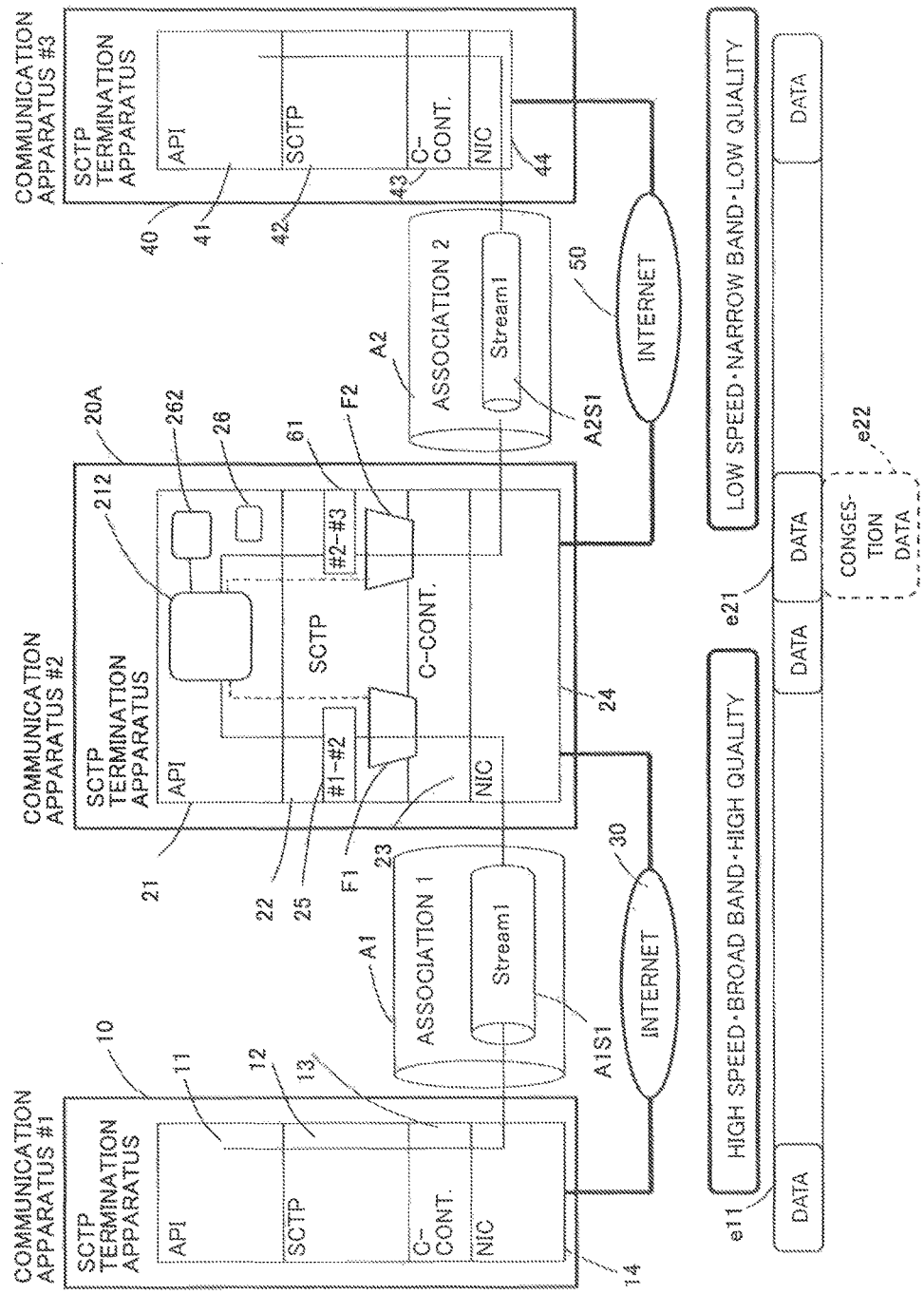
FIG. 5 is a diagram illustrating an example of a configuration of the communication system according to an embodiment.

FIG. 5 is a diagram illustrating an example of a configuration of the communication system according to the embodiment. The communication system illustrated in FIG. 5 is the same as the communication system in the reference example (FIG. 1) in terms of including the communication apparatus #1, the communication apparatus #2 connected to the communication apparatus #1 via the Internet 30, and the communication apparatus #3 connected to the communication apparatus #2 via the Internet 50.

The embodiment is, however, different from the reference example in terms of applying a communication apparatus including an SCTP termination apparatus 20A to the communication apparatus #2 operating as a relay apparatus. A configuration of the communication apparatus #2 (the SCTP termination apparatus 20A) will hereinafter be described.

<Configuration of Communication Apparatus #2>

Figure 6:
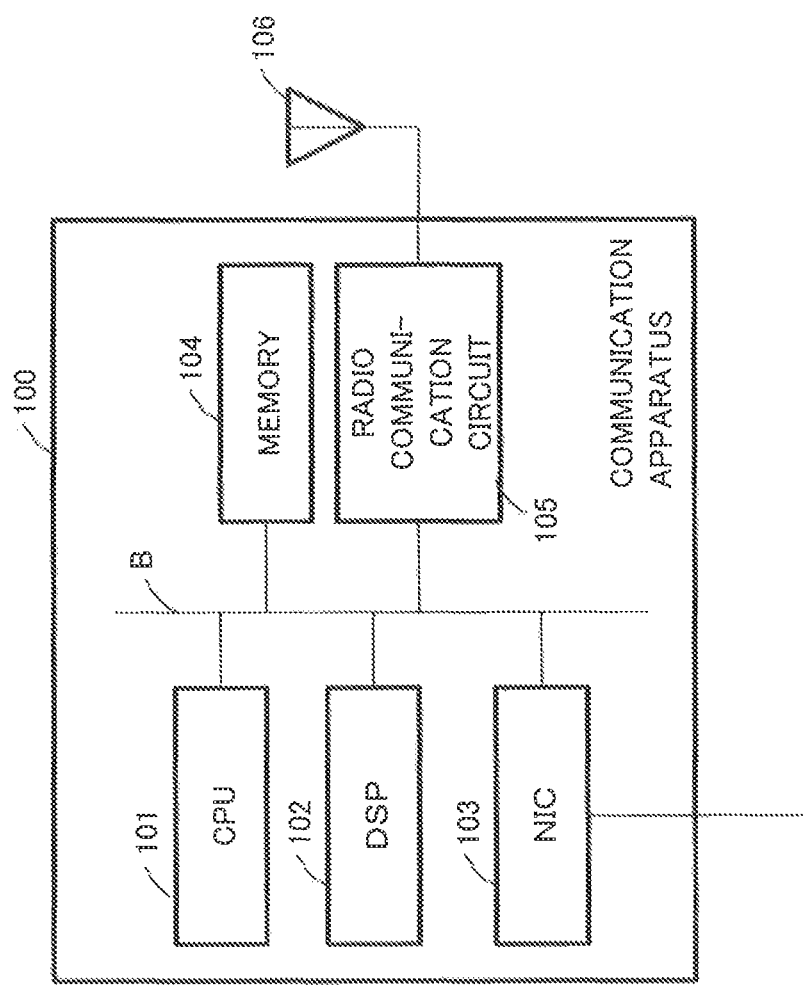
FIG. 6 is a diagram illustrating an example of a hardware configuration of a communication apparatus (base station) applicable to a communication apparatus #2 (SCTP termination apparatus 20A) according to the embodiment.

FIG. 6 is a diagram illustrating an example of a hardware configuration of the communication apparatus (a base station) applicable to the communication apparatus #2 (the SCTP termination apparatus 20A) according to the embodiment. In FIG. 6, a communication apparatus 100 includes a CPU (Central Processing Unit) 101, a Digital Signal Processor (DSP) 102, a NIC 103, a storage device 104, and a radio transmission/reception circuit 105, which are interconnected via a bus B. The radio transmission/reception circuit 105 is connected to a transmission/reception antenna 106.

The storage device 104 includes a main storage device and an auxiliary storage device. The main storage device includes a storage combined with, e.g., a Random Access Memory (RAM) or a Read Only Memory (ROM). The main storage device is used as an operation area for the CPU 101. The ROM included by the main storage device stores a program (firmware) and data used when executing the firmware.

The auxiliary storage device stores programs (Operating System (OS), application programs, etc.) executed by the CPU 101 and data used when executing the programs. The auxiliary storage device can select at least one of, e.g., a Hard Disk Drive (HDD), a Solid State Drive (SSD), a flash memory and an Electrically Erasable Programmable Read-Only Memory (EEPROM). The auxiliary storage device may include a non-transitory disk storage medium (instanced by a CD, a DVD, a Blu-ray disc and other equivalent storage mediums).

The CPU 101 loads the program stored in the storage device 104 into the operation area of the main storage device and executes the program, thereby executing predetermined processes. For example, the CPU 101 can operate as the API and the SCTP processing unit by executing the programs.

The DSP 102 executes processes pertaining (relating) to transmission and reception of signals transmitted and received for the communications with the communication apparatus #1 and the communication apparatus #3. The DSP 102 operates as a baseband unit (BB unit) to execute a digital baseband process (BB process) provided for the base station to perform wireless communications with a radio terminal. The BB process includes a process of generating a BB signal by encoding and modulating the data, and a process of obtaining the data by demodulating and decoding the BB signal.

The NIC 103 is an interface circuit to handle the process of transmitting and receiving the signals with respect to the network. The radio transmission/reception circuit 105 executes a modulation process for the BB signal (conversion into an analog signal) given from the DSP 102, up-converting the analog signal into a radio signal, and modulating the up-converted signal. The amplified signals (radio signals) are radiated from the transmission/reception antenna 106 and received by an unillustrated radio terminal. The radio signals received by the transmission/reception antenna 106 and transmitted from the radio terminal are low-noise-amplified and down-converted by the radio transmission/reception circuit 105, then converted into digital signals (BB signals) by a demodulation process, and sent to the DSP 102.

Each storage device 104 is one example of a "storage device", a "memory" and a "non-transitory computer readable recording medium". Each of the CPU 102 and the DSP 102 is one example of a "processor", a "microprocessor", a "control apparatus", a "controller" and a "control unit". The NIC is one example of a "transmitter" or a "transfer unit".

Note that the hardware configuration of the communication apparatus 100 can be also applied to the communication apparatus #1 and the communication apparatus #2, respectively. It is to be noted that the processes executed by the CPU 101 and the DSP 102 may also be executed by using at least of one of an electric/electronic circuit, an integrated circuit and a semiconductor device. The integrated circuit includes at least one of an Integrated Circuit (IC), a Large Scale Integrated circuit (LSI), and an Application Specific Integrated Circuit (ASIC). The semiconductor device includes a programmable logic device (PLD) instanced by a Field Programmable Gate Array (FPGA).

Figure 7:
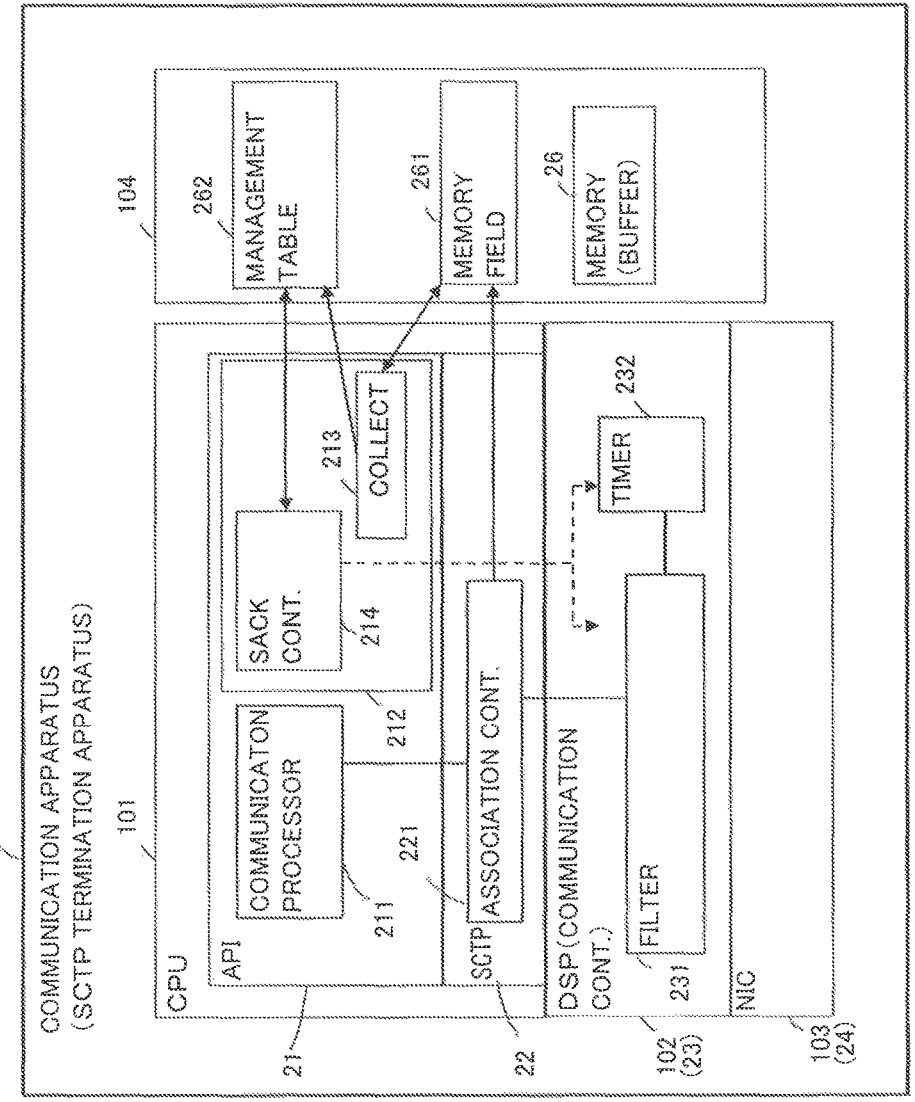
FIG. 7 is a diagram schematically depicting a configuration of the communication apparatus #2 to which the communication apparatus illustrated in FIG. 6 is applied.

FIG. 7 is a diagram schematically depicting a configuration of the communication apparatus #2 to which the communication apparatus 100 is applied. As depicted in FIG. 7, the CPU 101 operates as the API 21 and the SCTP processing unit 22 by executing the programs. The API 21 includes a communication data processing unit 211 and a management unit 212. The communication data processing unit 211 includes a collection unit 213 to collect information pertaining to the data transfer, and a SACK control unit (SACK controller) 214.

The SCTP processing unit 22 includes a communication association control unit (communication association controller) 221. The communication association control unit 221 executes SCTP-based processes instanced by establishing and cutting off the association, generating the streams, and transfer control and retransmission control each based on a sequence number. At least one of the storage devices 104 is provided with a storage area 261 for quality data (also called quality information). The communication association control unit 221 stores, in the storage area 261, the information as the quality data pertaining to a quality of the SCTP-based communications, the quality being obtained through the SCTP control.

The collection unit 213 of the API 21 reads the quality data from the storage area 261 at a predetermined timing (any of "real time", a "random cycle" and a "fixed cycle" may be available), and stores the quality data in a communication status management table 262. The management table 262 retains a value indicating a communication status of the SCTP-based communication from the communication apparatus #2 to the communication apparatus #3, and a threshold value pertaining to every item of information. The management table 262 is stored in at least one of the storage devices 104. The SACK control unit (SACK controller) 214 performs, when the value indicating the communication status that is stored in the management table 262 exceeds the threshold value, control for inhibiting the data transmission to the communication apparatus #2 from the communication apparatus #1.

The DSP 102 operates as the communication control unit (C-CONT.) 23. The DSP 102 includes a filter 231 and a timer 232. The filter 231 filters (discards) the SACK chunk transmitted to the communication apparatus #1 and the SACK chunk transmitted from the communication apparatus #3 in accordance with an instruction given from the SACK control unit 214. The timer 232 measures a predetermined period of time. Note that the filtering conducted by the filter 231 may also be executed by the CPU 101.

In the communication apparatus 100 operating as the communication apparatus #1 and the communication apparatus #3, the CPU 101 operates as the API 11 (41) and the SCTP processing unit 12 (42). The DSP 102 operates as the communication control unit (communication controller) 13 (43). The NIC 103 operates as a NIC 24 (44). The communication apparatus #1 and the communication apparatus #3 may not, however, include the management unit 212, the management table 262 and the filter 231.

The communication apparatus #2 (the SCTP terminal apparatus 20A) includes the components depicted in FIG. 5 as the corresponding components to those illustrated in FIG. 7. The management unit 212 and the management table 262 with respect to the API 21 are illustrated in the SCTP termination apparatus 20A in FIG. 5. A process 25 pertaining to the SCTP-based communications between the communication apparatus #1 and the communication apparatus #2 and a process 61 pertaining to the SCTP-based communications between the communication apparatus #2 and the communication apparatus #3 are illustrated as the processes to be executed by the communication association control unit (communication association controller) 221. A filtering process F1 of the signals to be transmitted and received between the communication apparatus #1 and the communication apparatus #2 and a filtering process F2 of the signals to be transmitted and received between the communication apparatus #2 and the communication apparatus #3 are illustrated as the processes to be executed by the communication control unit 23.

<Values Pertaining to Data Transfer>

Described are values pertaining to the data transfer to the transfer destination and stored in the management table 262. The values related to the data transfer to the transfer destination can contain a value indicating the communication status with the transfer destination. The value (parameter) indicating the communication status contains a value (e.g., at least one of an SCTP retransmission count, an SCTP retransmission probability and a retransmission interval) pertaining to the data retransmission to the transfer destination. The value pertaining to the data retransmission to the transfer destination contains a data reception quantity from the sender (transmission source), a buffer quantity, a signal discard quantity, Round-Trip Time (RTT) and a throughput, and at least one of these parameters can be selected as this value.

The SCTP retransmission count indicates a number of times the data transferred to the communication apparatus #3 (the transfer destination) is retransmitted. When the retransmission count reaches a range in excess of a predetermined threshold value, the SACK control is carried out. The SCTP retransmission probability indicates a retransmission probability of the data per unit time in the data transfer to the communication apparatus #3. When the SCTP retransmission probability reaches a range in excess of a predetermined threshold value, the SACK control is executed.

The retransmission interval indicates a time interval (e.g., an average value per unit time) at which the data retransmission to the communication apparatus #3 occurs. When the retransmission interval reaches a range shorter than a given threshold value, the SACK control is carried out. The data reception quantity indicates a data reception quantity (a received data size) of how much the data is received from the sender (transmission source), i.e., the communication apparatus #1 per unit time. When the data reception quantity reaches a range in excess of a predetermined threshold value, the SACK control is carried out. The data reception quantity may be a data size and may also be a number of DATA chunks.

The buffer quantity indicates, e.g., a remaining size (unused size) of the memory (buffer) 26 usable for storing the data given from the communication apparatus #1. The remaining size can involve using a_rwnd value (Advertised Receiver Window Credit, which is an amount of dedicated buffer space for the association). When the buffer quantity (the remaining size) reaches a range smaller than a predetermined threshold value, the SACK control is executed. The buffer quantity can involve using a buffer resident quantity. The buffer resident quantity indicates a size of the data resident in the memory (buffer) 26. When the data size reaches a range in excess of a predetermined threshold value, the SACK control is carried out.

A signal discard quantity indicates a quantity of how much the signals or requests given from the communication apparatus #1 are discarded. When the discard quantity reaches a range in excess of a predetermined threshold value, the SACK control is executed. The throughput indicates a transmission data quantity per unit time to the communication apparatus #3 (the transfer destination) from the communication apparatus #2 (a transfer source). When the throughput reaches a range lower than a predetermined threshold value, the SACK control can be carried out. Whatever existing methods can be applied to a throughput measuring method.

The RTT indicates a period of time till a response is returned since transmitting the signal to the communication apparatus #3. The SCTP entails conducting a heartbeat check about a path with the association being established. The heartbeat check is conducted such that the sender (transmission source) sends an SCTP HEART BEAT chunk to the recipient and receives a SCTP HEART BEAT ACK chunk from the recipient. A period of time till receiving the SCTP HEART BEAT ACK chunk since transmitting the SCTP HEART BEAT chunk, can be measured as the RTT. A signal type for measuring the RTT and a measuring method are not, however, limited to the SCTP HEART BEAT chunk.

When the RTT reaches a range in excess of a predetermined threshold value, the SACK control is executed.

Each value pertaining to the transfer destination is a parameter that varies corresponding to a change of the communication environment, and it is also, however, feasible to execute or not to execute the SACK control based on a fixed parameter. The fixed parameter is exemplified by a communication protocol type and a communication rate with respect to the transfer destination.

The communication protocol type with respect to the transfer destination indicates a protocol type used for the communication apparatus #2 to transfer the data to the communication apparatus #3. For example, when the protocol type is a protocol instanced by PPPoE (Point-to-Point Protocol over Ethernet) normally used for a low speed line, the SACK control is carried out. The communication rate indicates a network communication speed at which the communication apparatus #2 performs the transmission to the communication apparatus #3. When the communication speed exceeds a threshold value, the SACK control is executed. As a matter of course, the communication rate varies during the communications, in which case the SACK control can be executed when the communication rate reaches a range lower than a predetermined threshold value.

The following embodiment will discuss an example of using the SCTP retransmission count, the data reception quantity and the buffer residual quantity (the remaining buffer size) as values each indicating the communication status. It is, however, a matter of course that the values each indicating the communication status may encompass, without being limited to the foregoing instanced values, values other than these instanced values. The SCTP retransmission count, the data reception quantity and the buffer residual quantity will hereinafter be generically termed "quality data". It does not, however, mean that parameters other than the SCTP retransmission count, the data reception quantity and the buffer residual quantity are excluded from the "quality data".

<Example of Data Structure of Management Table>

Figure 8:
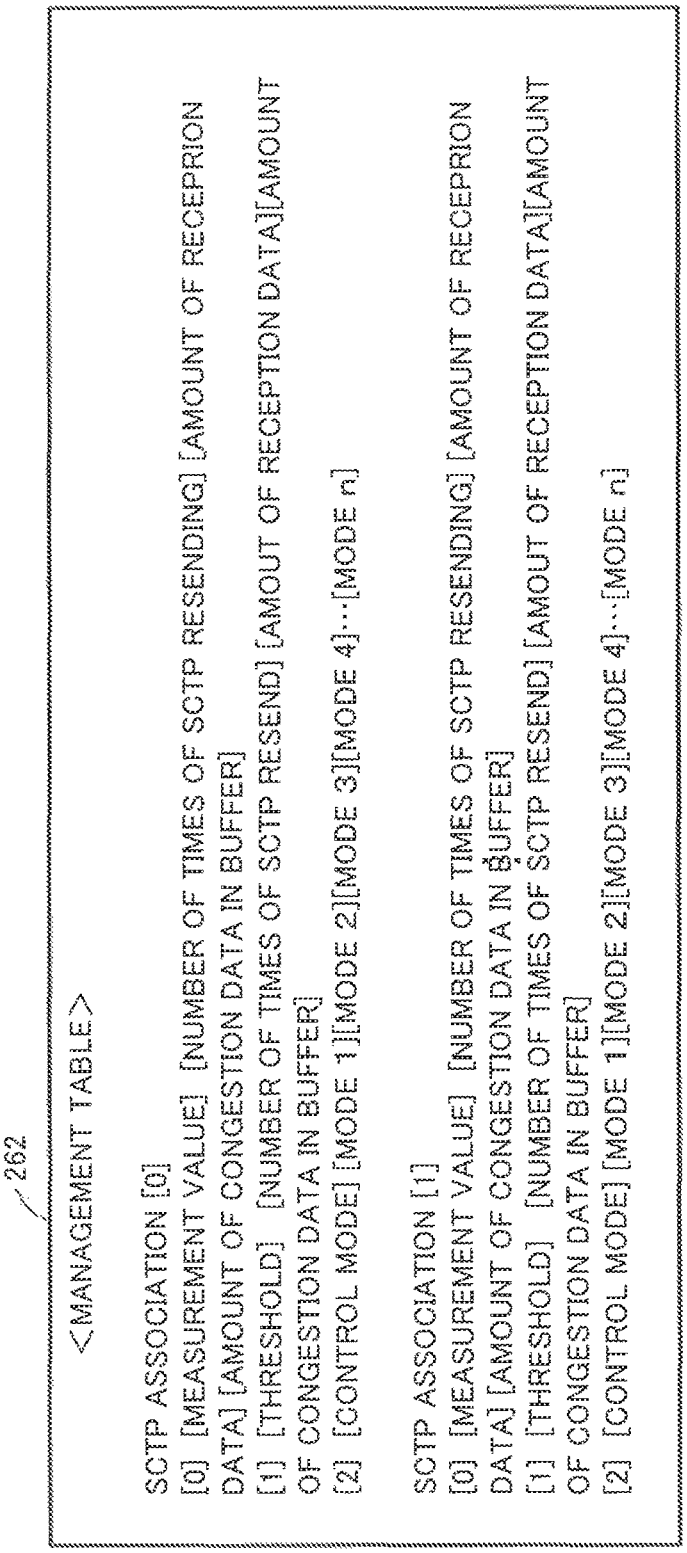
FIG. 8 is a diagram illustrating an example of a data structure of a management table.

FIG. 8 illustrates an example of a data structure of the management table 262. The management table 262 stores items of information indicating quality data, threshold values of the quality data and control modes per SCTP association. In the example illustrated in FIG. 8, there are stored the measured values of the SCTP retransmission count, the data reception quantity and the buffer residual quantity as one example of the quality data. Stored also are threshold values corresponding to the SCTP retransmission count, the data reception quantity and the buffer residual quantity.

FIG. 9 is an explanatory diagram illustrating one example of the control mode stored in the management table 262. In the example, modes 1-5 are illustrated as the control mode. A control target is designated in the mode 1. An association number of the control target is stored as a value corresponding to the mode 1.

A control method in the SACK control is designated in the mode 2. Stored as values corresponding to the mode 2 are a value representing a discard of the SACK, a value representing a stop of transmitting the SACK, a value representing a discard of the SACK within designated time, and a value representing a discard of the data. The designated time indicates time when inhibiting the SACK from being transmitted to the communication apparatus #1.

A control method in the SACK control is designated in the mode 3. A value representing a stop of updating a Transmission Sequence Number (TSN) is stored as a value corresponding to the mode 3. A value representing building-up of an independent communication path is stored in the mode 4. Stored are, for example, a value that represents newly generating the SCTP association, and a value that represents newly generating the SCTP stream. Values representing notification of capability information, statistic information and limit information are stored in the mode 5. Stored, for example, are a value designating notification of information on the measured value, and a value designating the notification of a resident count (buffer size) allocatable to the SCTP association.

<Operational Example in Communication System>

Figure 11:
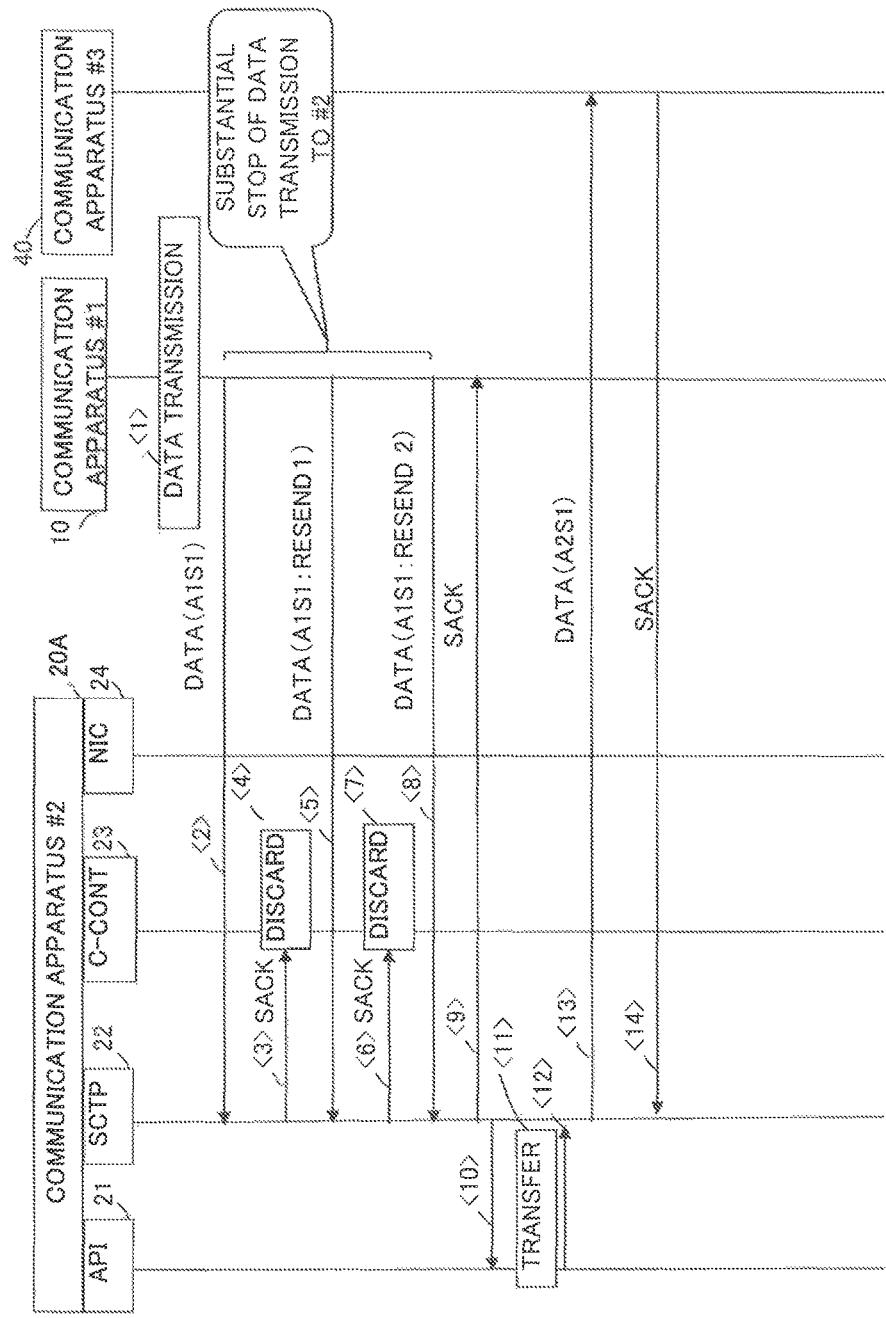
FIG. 11 is a sequence diagram illustrating an operational example of the communication system (FIG. 5) according to the embodiment.

FIGS. 10 and 11 are sequence diagrams each illustrating an operational example of the communication system (FIG. 5) according to the embodiment. In FIG. 10, the communication apparatus #2 (the SCTP termination apparatus 20A) performs, based on the SCTP, a process of transferring the data received from the communication apparatus #1 to the communication apparatus #3 (FIG. 10<1>). Along with this process, the communication association control unit 221 stores the quality data pertaining to the data transfer to the communication apparatus #3 in the storage area 261 of the storage device 104.

The collection unit 213 (the CPU 101) in the API 21 of the communication apparatus #2 periodically starts up (FIG. 10<2>), then collects the quality data stored in the storage area 261 (FIGS. 10<3>,<4>), and stores the collected quality data in the management table 262 (FIG. 10<5>).

Then, the SACK control unit 214 (the CPU 101) refers to the management table 262 (FIG. 8), and thus compares each item (value) of quality data with the threshold value, thereby determining whether there is any item (value) exceeding the threshold value (FIG. 10<6>).

In this case, the SACK control unit 214 sets the SACK control based on the mode information (FIG. 9). For example, the SACK control unit 214 conducts the setting for the filter 231 to discard the SACK with respect to the data received from the communication apparatus #1 (FIG. 10<7>). The filter 231 reaches a status of discarding the SACK, based on an instruction given from the SACK control unit 214 (FIG. 10<8>).

Thereafter, as illustrated in FIG. 11, subsequent to a change of the filter setting, the communication apparatus #1 executes a data transmission process (FIG. 11<1>). The data (the data chunk) is thereby received by the SCTP processing unit 22 of the communication apparatus #2 via the stream A1S1 (FIG. 11<2>).

The SCTP processing unit 22 stores (buffering) the data of the received data chunk in the memory 26, and generates and transmits the SACK (SACK chunk) toward the communication apparatus #1 (FIG. 11<3>). The SACK chunk is, however, discarded by the filter 231 of the communication control unit 23 (the DSP 102) (FIG. 11<4>).

The communication apparatus #1 is disabled from receiving the SACK chunk even when standby time for the SACK chunk expires, and therefore retransmits the data after retry time has expired (retransmission 1, FIG. 11<5>). The communication apparatus #2 discards the SACK about the data, based on the filter setting (FIGS. 11<6>, <7>). The communication apparatus #1 is disabled from receiving the SACK and therefore further retransmits the data (retransmission 2, FIG. 11<8>). The filter setting (the SACK control) is thus made, during which the data transmission from the communication apparatus #1 is substantially stopped.

Note that the data received in FIGS. 11<2>, <5> can be set not to be transmitted to the communication apparatus #3 when the SACK chunk is discarded. For instance, the data are discarded before being stored in the memory (buffer) 26.

Alternatively, the data maybe temporarily stored in the memory 26 and discarded by the filter 231 (F2 in FIG. 5) when transmitted to the communication apparatus #3.

Though not illustrated in FIG. 11, the collection of the quality data and the determination about the threshold value are made, e.g., periodically. As the quality data are collected, the measured values stored in the management table 262 are updated. As a result of the update, it happens as the case may be that each measured value becomes a state of not exceeding any of threshold values. In this case, the filter setting described above is cancelled.

When transmitting the data in Retransmission 2 of FIG. 11, it is supposed that the filter setting will have been canceled. In this instance, the SACK chunk transmitted from the SCTP processing unit 22 is transmitted to the communication apparatus #1 without being discarded by the filter 231 (FIG. 11<9>). On the other hand, the SCTP processing unit 22 notifies the API 21 of the data reception (FIG. 11<10>), and transfers the data to the communication apparatus #3 (FIG. 11<13>) after obtaining a transfer instruction from the API 21 (FIGS. 11<11>, <12>). Thereafter, the communication apparatus #2 receives the SACK chunk indicating the data reception from the communication apparatus #3 (FIG. 11<14>). When the SACK chunk indicates an approval of the data reception, the data is deleted from the memory 26.

As described above, according to the operational example, when the value (the measured value measured for the data transfer in the operational example) pertaining to the data transfer to the communication apparatus #3 reaches the range (predetermined range) in excess of the threshold value, the SACK chunk to the communication apparatus #1 is discarded (transmission of the SACK chunk is inhibited). The data transmission from the communication apparatus #1 can be thereby substantially stopped. The communication environment between the communication apparatus #1 and the communication apparatus #2 can be therefore made close to the communication environment between the communication apparatus #2 and the communication apparatus #3. This contrivance enables the resident data quantity in the memory (buffer) 26 to be restrained. Consequently, the capacity of the memory (buffer) 26 can be reduced.

Note that the operational example is contrived not to transfer the data to the communication apparatus #3 when the SACK chunk is discarded. Even when the SACK chunk is discarded, however, the data may be transmitted to the communication apparatus #3. In this case, the data transmission from the communication apparatus #1 is substantially stopped, during which the data resident in the memory 26 are transferred to the communication apparatus #3, whereby the resident data quantity can be restrained.

In the operational example described above, it is determined corresponding to the update of the management table 262 whether the measured value exceeds the threshold value, and, when there exists the measured value exceeding the threshold value, the SACK chunk is set to be discarded (the transmission of the SACK chunk is inhibited) as by the filter setting. However, the comparison between the measured value and the threshold value (the discard setting of the SACK chunk) may not be made corresponding to the update of the management table 262. In other words, the comparison between the measured value and the threshold value may also be made periodically or at a proper timing in response to an instruction.

<SCTP Header and Chunk>

Figure 12:
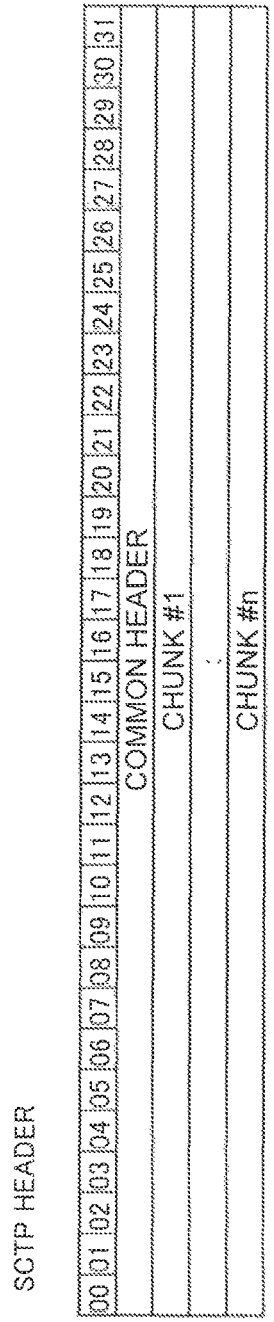
FIG. 12 is a diagram illustrating a data structure of an SCTP header.

Next, an SCTP header and principal chunks used in the embodiment will be described. FIG. 12 is a diagram depicting a data structure of the SCTP header. The SCTP header is structured to include a Common Header and an n-number ("n" is a natural number) of chunks subsequent to the Common Header. In FIG. 12, numerals in an uppermost field indicate bits. A maximum number of the chunks depends on a size of MTU (Maximum Transmission Unit). Predetermined chunks instanced by the SCTP chunk, the INIT chunk and the INIT ACK chunk cannot, however, be flowed together (carpooling) with other chunks.

Figure 13:
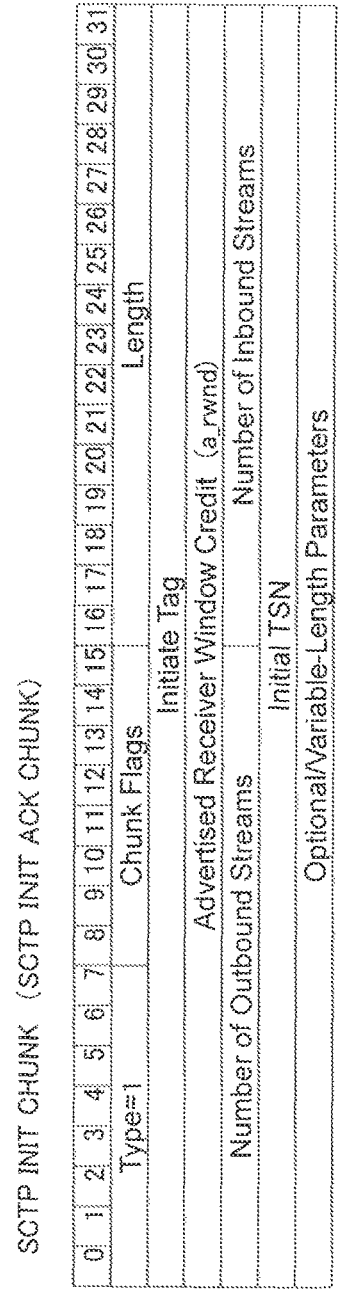
FIG. 13 is a diagram illustrating a data structure of an SCTP INIT chunk.

FIG. 13 is a diagram depicting a data structure of the SCTP INIT chunk. A start of an association establishing procedure is triggered by transmitting the INIT chunk. An SCTP packet containing the SCTP INIT chunk corresponds to the "SCTP connection request" explained in FIG. 3.

The principal fields will be described. A "Type" field represents a type of the chunk, and "Type=1" indicates that the chunk is the INIT chunk. An "Advertised Receiver Window Credit (a_rwnd)" field indicates a minimum quantity of the reception buffer, which is allocated to the association established by the sender (transmission source) of the INIT chunk. The reception side of "a_rwnd" can also change "a_rwnd" by transmitting "a_rwnd" to the sender (transmission source) through the SACK chunk.

A "Number of Outbound Streams" field indicates a maximum number of the streams outgoing (outbound) from the data transmission side. A "Number of Inbound Streams" field indicates a number of inbound streams, which are permitted to be generated on the data reception side. An "Initial TSN" field indicates an initial value of TSN (Transfer Sequence Number) used for transmitting the data.

A data structure of the SCTP INIT ACK chunk is the same as the structure of the INIT chunk, and hence its illustration is omitted. As for the parameter, however, a value on the reception side of the INIT chunk is set. Further, "Cookie" is given as a parameter not contained in the INIT chunk.

FIG. 14 is a diagram depicting a data structure of the SCTP DATA chunk. Principal parameters are given as below. To be specific, a "TSN" field indicates a sequence number of the DATA chunk, and the reception side of the DATA chunk acknowledges the reception of the TSN of the DATA chunk, and sends the SACK chunk in exchange.

A "Stream Identifier" field indicates an identifier of the stream related to (used for transmitting the DATA chunk) the DATA chunk. A "Stream Sequence Number" field indicates a sequence number in one stream specified by the stream identifier. A "User Data" field indicates data itself that is carried by being contained in the DATA chunk, the data being variable in length.

FIG. 15 illustrates a data structure of the SCTP SACK chunk. The following are principal chunks of the SCTP SACK chunk. A "Cumulative TSN Ack" field indicates the last TSN arrived in due sequence from the initial TSN. The data transmission side refers to the value of the "Cumulative TSN Ack" field and thus can recognize which TSN the transmission side completes the reception in due sequence up to.

An "a_rwnd" is the same as "a_rwnd" registered in the INIT chunk. However, the reception buffer size (the data quantity to be transmitted at one time by the transmission side) can be changed by setting this value different from the initial value of "a_rwnd".

Gap Ack block information is for obtaining SR used for the transmission side to recognize the missed RSN. A "Gap Ack Block #1 Start" field and a "Gap Ack Block #1 End" field are used when a gap (missing of TSN) occurs due to missing of the DATA chunk and a disturbance of the arrival sequence. When the reception side receives all of TSNs transmitted so far by the transmission side, the last TSN is set in the value of the "Cumulative TSN ACK" field, resulting in null of this field.

The TSNs existing between the "Gap Ack Block #1 Start" field and the "Gap Ack Block #1 End" field are treated as being already received. Such a case exists that the TSN exists subsequent to a given TSN in a status of this given TSN not being received. In this case, this TSN is indicated by a value of the "Gap Ack Block #1 Start" field and a value of the "Gap Ack Block #1 End" field. The transmission side is thereby enabled to find out the missed TSN by referring to the values pertaining to the Gap ACK blocks. The data can be retransmitted by retransmitting the DATA chunk containing the TSN specified by the Gap ACK Block information.

<Process of Communication Apparatus #2>

Next, a process of the communication apparatus #2 will be described.

«Collection Process of Quality Data»

FIG. 16 is a flowchart illustrating an example of the quality data collection process executed by the collection unit 213 (the CPU 101). The process in FIG. 16 is periodically executed at a fixed time interval. A start timing can be, however, properly set.

At first, the collection unit 213 obtains the SCTP retransmission count from the storage area 261 (FIG. 7) (01). Next, the collection unit 213 obtains the data reception quantity from the storage area 261 (FIG. 7) (02). Subsequently, the collection unit 213 obtains the buffer resident quantity from the storage area 261 (FIG. 7) (03). Note that the processes 01-03 may take whatever sequence.

Next, the collection unit 213 updates the management table, i.e., updates the SCTP retransmission count, the data reception quantity and the buffer resident quantity therein (04). Thereafter, the collection unit 213 stands by for a fixed period of time (05). Upon an elapse of a given period of time, the collection process is restarted.

«Process When Transmitted to Communication Apparatus #1»

Figure 17:
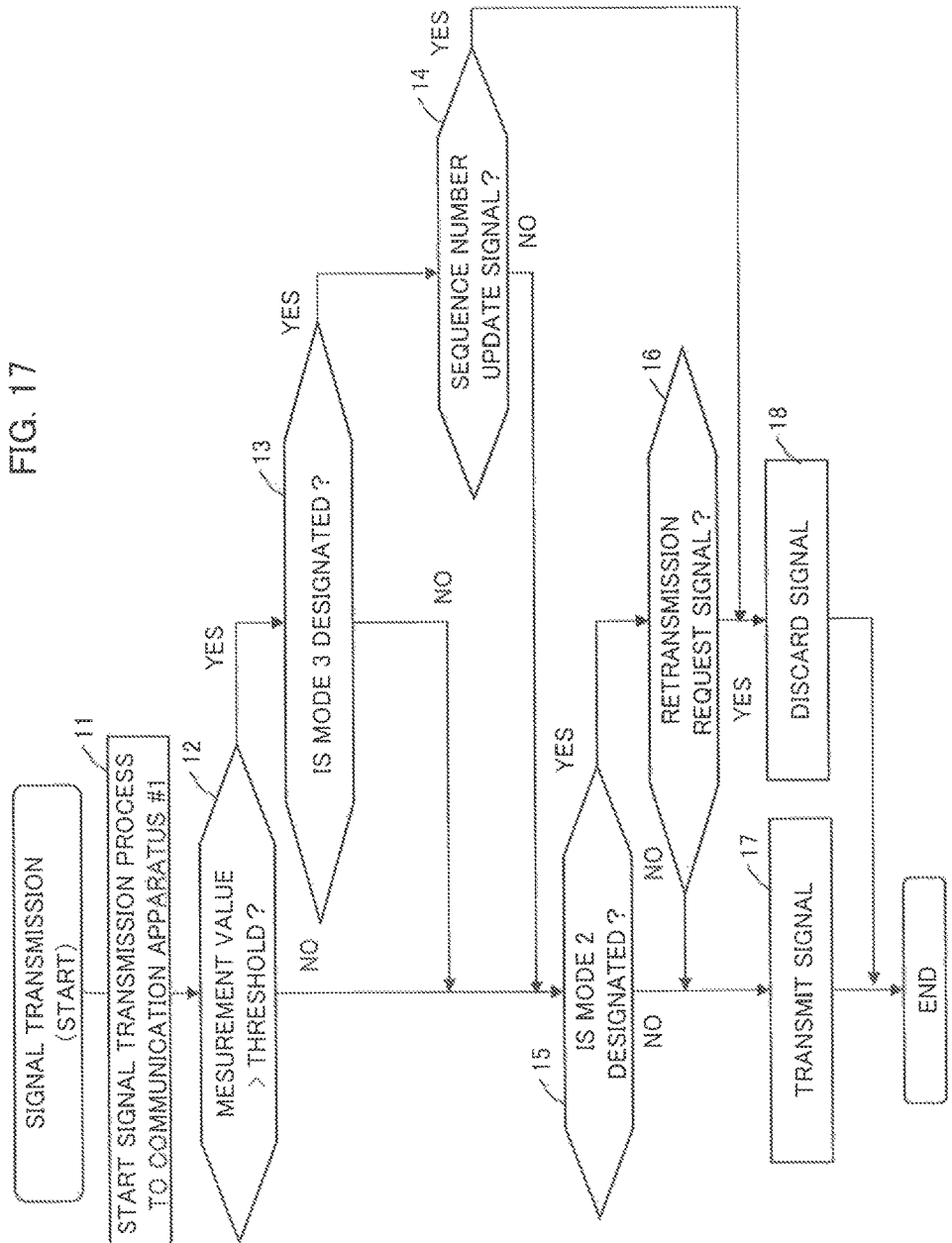
FIG. 17 is a flowchart illustrating a processing example pertaining to SACK control when transmitting a signal to a communication apparatus #1.

FIG. 17 is a flowchart illustrating a processing example pertaining to the SACK control when transmitting the signal to the communication apparatus #1. The process depicted in FIG. 17 is executed by the SACK control unit 214 (the CPU 101) and the filter 231 (the DSP 102). A premise of the process illustrated in FIG. 17 entails determining a purport that there already exists the measured value exceeding the threshold value, and setting the process designated in the mode 2 or the mode 3 according to this determination.

In first step 11, upon starting the process of transmitting the signal to the communication apparatus #1, the SACK control unit 214 refers to the management table 262 (FIG. 8), and thus determines whether or not there exists any measured value of the quality data in excess of the threshold value (12). Hereat, the processing diverts to 13 when the measured value exceeding the threshold value exists, but advances to 15 whereas when not. Note that this example involves determining whether at least one of the plurality of measured values exceeds the threshold value, and may include a condition for determining whether a predetermined plural number of measured values exceed the threshold value.

When the processing diverts to 13, the SACK control unit 214 determines whether the mode 3 is designated as a processing content when exceeding the threshold value. The processing advances to 15 when the mode 3 is not designated but diverts to 14 whereas when the node 3 is designated.

The SACK control unit 214 determines in 14 whether a transmission target signal is a sequence number update signal. Hereat, when the signal is the sequence number update signal, the processing diverts to 18, in which the SACK control unit 214 instructs the filter 231 to discard the sequence number update signal. Whereas when the signal is not the sequence number update signal, the processing advances to 15.

The sequence number update signal connotes the SACK chunk containing the value of "Cumulative TSN ACK", this value being larger than the value of TSN (Cumulative TSN ACK) currently managed by the SACK control unit. The communication apparatus #1 having received the SACK chunk containing the updated value of the "Cumulative TSN ACK" starts transmitting the data that is not yet transmitted. The sequence number update signal is discarded (the transmission is inhibited), the communication apparatus #1 becomes a status of simply repeating the retransmission of data. When the retransmitted data is already stored in the memory 26, this data can be discarded. This contrivance restrains an increase of the data resident quantity (cumulative quantity) in the memory 26. The discard of the sequence number update signal is effective in delaying the retransmission timing of the DATA chunk from the communication apparatus #1. Thus, when the SACK chunk prompts the communication apparatus to transmit the non-transmitted data, this SACK chunk is discarded.

When the processing advances to 15, the SACK control unit 214 determines whether the mode 2 is designated as the processing content when exceeding the threshold value. Hereat, when the mode 2 is not designated, the transmission target signal is transmitted to the communication apparatus #1 by a normal process (17). Whereas when the mode 2 is designated, the processing diverts to 16.

The SACK control unit 214 determines in 16 whether the transmission target signal is a retransmission request signal. Hereat, when the signal is the retransmission request signal, the filter 231 discards the retransmission request signal in the process of 18. Whereas when the signal is not the retransmission request signal, this signal is transmitted to the communication apparatus #1.

The retransmission request signal connotes the SACK chunk with the Cumulative TSN ACK value being coincident with TSN (the last TSN approved for the reception) managed by the SACK control unit 214. Alternatively, the SACK chunk containing the Gap ACK Block information can be also considered to be the retransmission request signal. The retransmission timing of the DATA chunk from the communication apparatus #1 can be delayed by discarding the retransmission request signal. Thus, the SACK chunk is discarded when the SACK chunk indicates the data retransmission request.

«Process when Received from Communication Apparatus #1»

Figure 18:
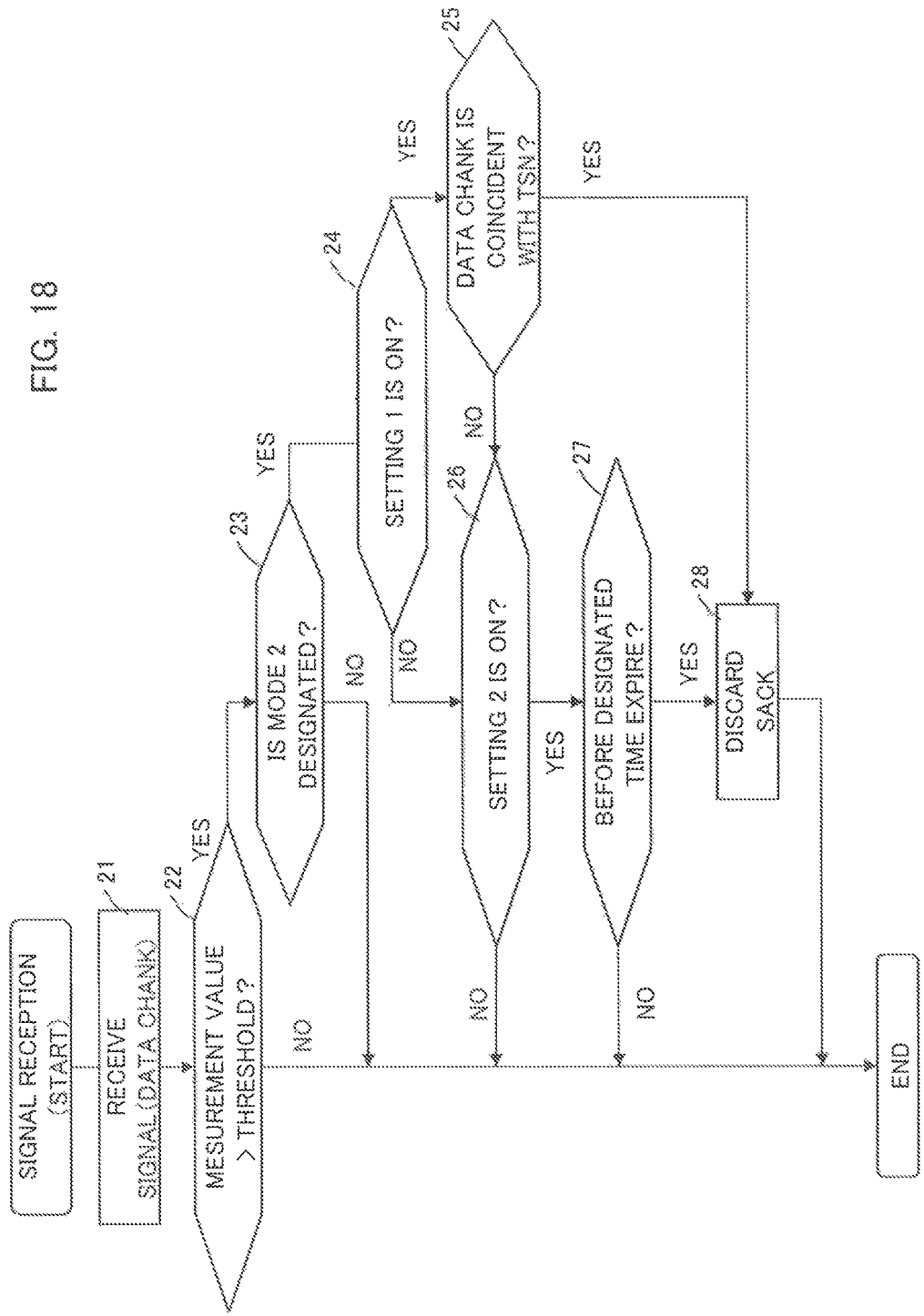
FIG. 18 is a flowchart illustrating a processing example pertaining the SACK control when receiving the signal (DATA chunk) from the communication apparatus #1.

FIG. 18 is a flowchart illustrating a processing example pertaining to the SACK control when the signal (DATA chunk) is received from the communication apparatus #1. The process depicted in FIG. 18 is executed by the SACK control unit 214 (the CPU 101) and the filter 231 (the DSP 102).

In 21 of FIG. 18, when detecting a start of a signal reception process, the SACK control unit 214 refers to the management table 262 (FIG. 8) and thus determines whether there exists any measured value of the quality data in excess of the threshold value (22). Hereat, the processing diverts to 23 when the measured value exceeding the threshold value exists, and the signal is received whereas when not (29).

The SACK control unit 214 determines in 23 whether the mode 2 is designated as a processing content (a content of the SACK control) when exceeding the threshold value. The processing is finished when the node 2 is not designated. Whereas when the mode 2 is designated, the processing diverts to 24.

The SACK control unit 214 determines in 24 whether the SACK chunk is set to be discarded when coincident with TSN as the control content designated in the mode 2 (whether setting 1 is ON or not). The processing diverts to 25 when being set so but diverts to 26 whereas when not.

The SACK control unit 214 determines in 25 whether "Cumulative TSN ACK" of the SACK chunk with respect to the received DATA chunk is coincident with TSN managed by the SACK control unit 214. When coincident with TSN, the SACK chunk is discarded (28). The SACK chunk is thereby not transmitted to the communication apparatus #1, and hence the data transmission timing from the communication apparatus #1 is delayed.

The SACK control unit 214 determines in 26 whether the SACK chunk is set to be discarded before the designated time expires as the control content designated in the mode 2 (whether setting 2 is ON or not). The processing advances to 22 when being set so but comes to an end whereas when not.

It is determined in 27 whether the designated time measured by the timer 232 does not yet reach the expiration. Hereat, when the designated time does not yet reach the expiration, the SACK chunk is discarded. The SACK chunk may be discarded by the SCTP processing unit 22 and may also be discarded by the filter 231. Whereas when the designated time expires, the processing is finished. In this case, the SACK chunk is transmitted to the communication apparatus #1. A start of the timer 232 can be triggered by, e.g., determining that the SACK control is conducted as a result of the determination about the threshold value in connection with collecting the quality data. As described above, the SACK chunk generated within the time for inhibiting the SACK chunk from being transmitted to the sender (transmission source) is discarded, thereby enabling the data transmission or retransmission of the sender (transmission source) to be delayed and consequently enabling the data resident quantity in the memory 26 to be restrained.

Note that the SACK chunk is, however, discarded in the process of FIG. 18, and, when the TSN of the DATA chunk is coincident with the managed TSN, the DATA chunk may also be discarded. Alternatively, the DATA chunk may be discarded when not yet reaching the expiration of the designated time. The transmission of the SACK chunk in response to the DATA chunk is consequently inhibited in this manner as well.

Note that the contents of the mode and the SACK control are checked in the processes of FIGS. 17 and 18, and there may be, however, executed the processes (of making a TSN comparison and determining whether the designated time expires) corresponding to the contents of the mode and the SACK control being conducted beforehand <Establishment of New Association>

In the embodiment, the SACK control described above operates to delay the transmission timing of the DATA chunk from the communication apparatus #1 by inhibiting the SACK chunk from being transmitted to the communication apparatus #1. The increase of the data resident quantity in the memory 26 is thereby restrained. However, the SACK control continues over a long period of time, in which case there is a delay of the end timing of transmitting the data to the communication apparatus #2 from the communication apparatus #1. Elongation of the communication time implies that the resources (the CPU and the memory) of, e.g., the communication apparatus #1 are occupied for the communications for a long time, and is therefore undesirable in terms of making an effective use of the resources. The embodiment is contrived to accelerate the end timing of the data transmission to the communication apparatus #2 from the communication apparatus #1 by executing the following process as an option.

Figure 19:
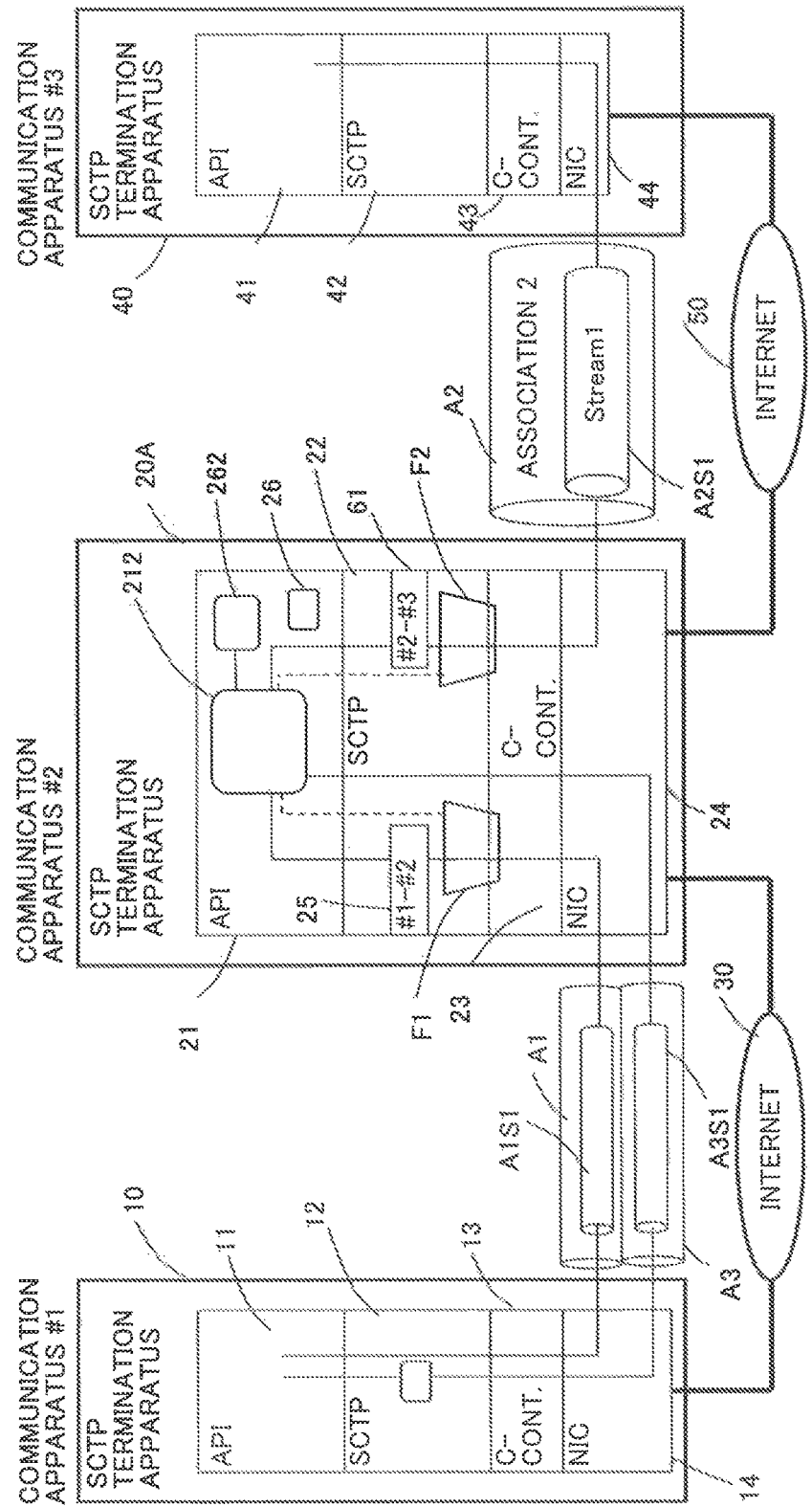
FIG. 19 is a diagram illustrating how a new association is established between the communication apparatus #1 and the communication apparatus #2.

For example, as illustrated in FIG. 19, a new association A3 is established between the communication apparatus #1 and the communication apparatus #2, the unsent data is transmitted via a stream A3S1 generated in the association A3.

Figure 20:
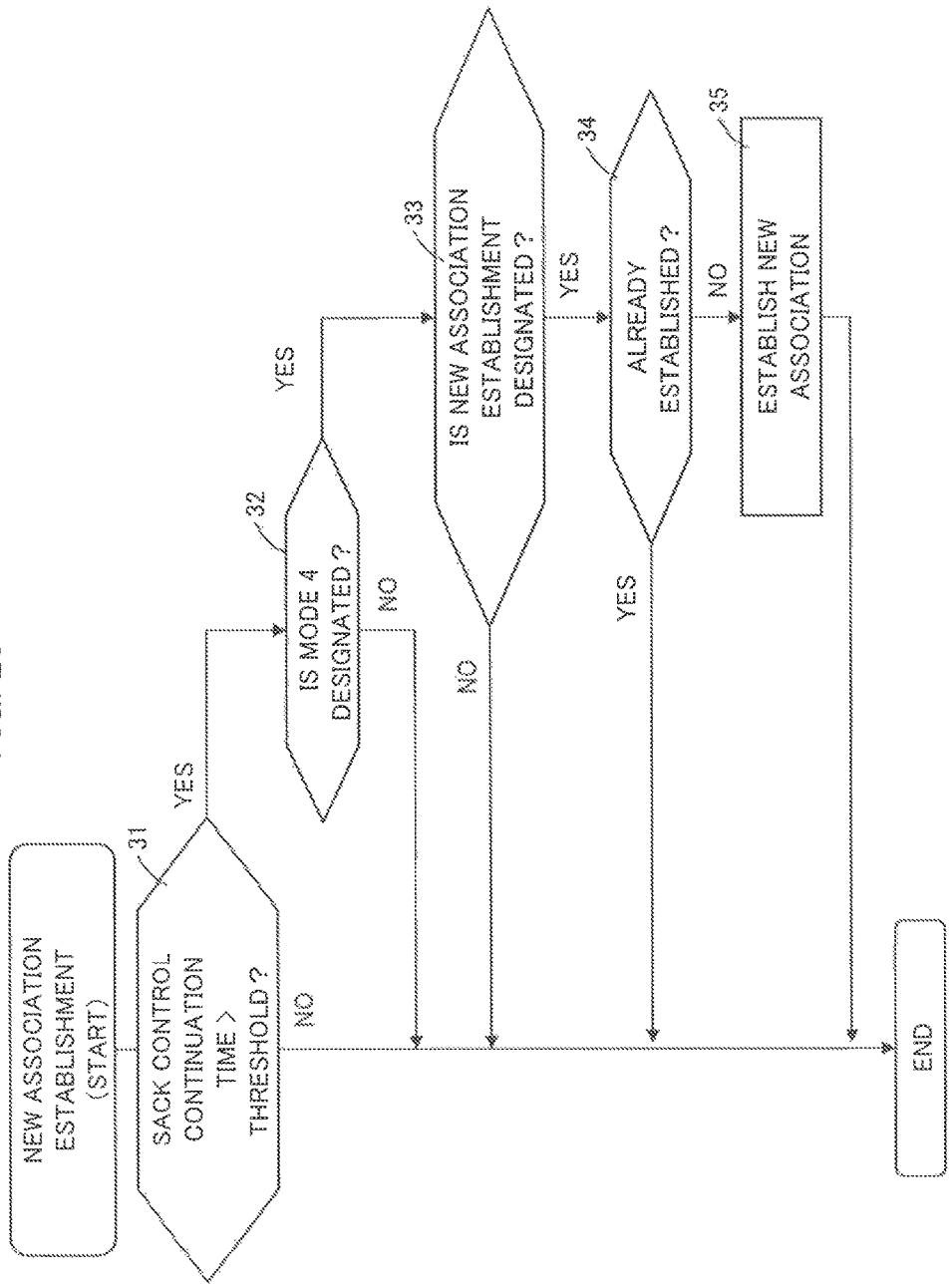
FIG. 20 is a flowchart illustrating a processing example of generating the new association.

FIG. 20 is a flowchart illustrating a processing example of how the new association is generated. A process depicted in FIG. 20 is executed by, e.g., the API 21 (the CPU 101). The process illustrated in FIG. 20 is based on a premise that the SACK control is performed in progress. A start of the SACK control is based on a premise that the unillustrated timer will have started measuring the time. The timer is reset upon finishing the SACK control, and starts upon restarting the SACK control.

In 31 of FIG. 20, the CPU 101 refers to the time (SACK control continuation time) measured by the timer, and thus determines whether the SACK control continuation time exceeds a threshold value. When not exceeding the threshold value, the process in FIG. 20 is finished. Whereas when the SACK control continuation time exceeds the threshold value, the processing diverts to 32.

In 32, the CPU 101 determines whether the mode 4 is designated as a control content when exceeding the threshold value. When the mode 4 is not designated, the process in FIG. 20 comes to an end. Whereas when the mode 4 is designated, the processing diverts to 33.

In 33, the CPU 101 determines whether the new association is designated to be established as a content of the mode 4. Hereat, when the new association is not designated to be established, the process in FIG. 20 is finished. Whereas when the new association is designated to be established, the processing advances to 34.

In 34, the CPU 101 determines whether an association other than the association A1 used for receiving the data from the communication apparatus #1 is already established. Hereat, when the association other than the association A1 is established, the process in FIG. 20 is finished. Whereas when the association other than the association A1 is not established, the processing advances to 35.

In 35, the CPU 101 (the API) instructs the SCTP processing unit 22 to establish the new association. The SCTP processing unit 22 establishes the new association (association A3) by executing the initialization with the communication apparatus #1. Hereat, the CPU 101 of the communication apparatus #2 negotiates with the communication apparatus #1 to receive a part or all of the unsent DATA chunks via the association A3 among the DATA chunks scheduled to be transmitted via the association A1.

Note that the association A3 to be newly generated can be established under some conditions pertaining to the communication quality. For example, the information illustrated as the mode 5 in FIG. 9 can be notified after establishing the association A3.

Figure 21:
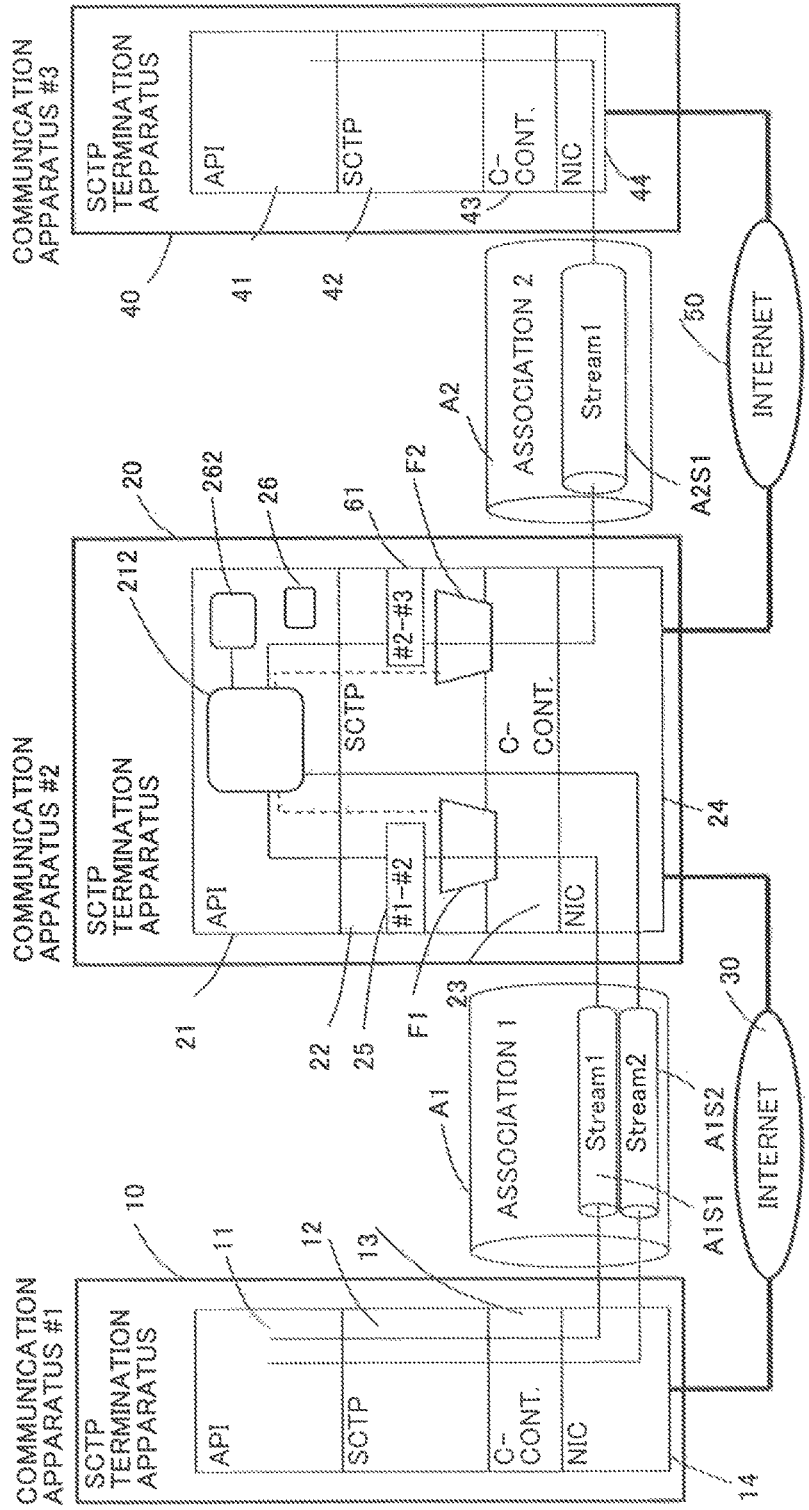
FIG. 21 is a diagram illustrating how a new stream is generated between the communication apparatus #1 and the communication apparatus #2.

As depicted in FIG. 21, a new stream A1S2 independent of the stream A1S1 is generated in the existing association A1 in place of establishing the new association, and the unsent data can be also received via this stream A1S2.

FIG. 22 is a flowchart illustrating a processing example of generating a new stream. The process illustrated in FIG. 22 is executed by, e.g., the API 21 (the CPU 101). The process illustrated in FIG. 22 is based on the premise that the SACK control is performed in progress. The start of the SACK control is based on the premise that the unillustrated timer will have started measuring the time. The timer is reset upon finishing the SACK control, and starts upon restarting the SACK control.

In 41 of FIG. 22, the CPU 101 refers to the time (the SACK control continuation time) measured by the timer, and thus determines whether the SACK control continuation time exceeds the threshold value. When not exceeding the threshold value, the process in FIG. 22 is finished. Whereas when the SACK control continuation time exceeds the threshold value, the processing diverts to 42.

In 42, the CPU 101 determines whether the mode 4 is designated as the control content when exceeding the threshold value. When the mode 4 is not designated, the process in FIG. 22 comes to an end. Whereas when the mode 4 is designated, the processing advances to 44.

In 43, the CPU 101 determines whether the new stream is designated to be generated as a content of the mode 4. Hereat, when the new stream is not designated to be generated, the process in FIG. 22 is finished. Whereas when the new stream is designated to be generated, the processing advances to 44.

In 44, the CPU 101 determines whether a stream other than the stream A1S1 used for receiving the data from the communication apparatus #1 is already generated. Hereat, when the stream other than the stream A1S1 is generated, the process in FIG. 22 is finished. Whereas when the stream other than the stream A1S1 is not generated, the processing advances to 45.

In 45, the CPU 101 (the API) instructs the SCTP processing unit 22 to generate the new stream. The SCTP processing unit 22 generates a stream A1S2 with the communication apparatus #1 by use of parameters pertaining to the association A1. Hereat, a part of the data scheduled to be received via the stream A1S1 is set to be received via the stream A1S2.

The plural streams generated in the association are independent of each other, and hence the communication status in the stream A1S1 does not affect the communication via the stream A1S2. Note that the stream A1S2 may be previously generated when establishing the association A1, and may start being used when the SACK control time exceeds the threshold value.

When the association A3 and the stream A1S2 are generated, the data received via the generated association and stream can be stored in the memory 26 (the storage device 104). After finishing the transfer of the data (toward the communication apparatus #3) received via the association A1 or the stream A1S1, the data can be transferred via the association A2. However, methods other than the method described above can be also applied.

Note that the embodiment has discussed the example in which the communication apparatus #1 is the host apparatus (RNC or MME) of the base station, while the communication apparatuses #2 and #3 are the base stations, and, however, the SACK control described in the embodiment may be applied to communication apparatuses (information processing apparatuses) exclusive of those communication apparatuses. The embodiment has also discussed the example of performing the SCTP based data transfer between the communication apparatus #2 and the communication apparatus #3, and, however, the communication for the data transfer may not necessarily be performed based on the SCTP. For example, TCP (Transmission Control Protocol) is applied as the case may be. The configurations according to the embodiment described above can be properly combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus, comprising:
   a memory that stores data transmitted using a protocol that a transmission source receives a response indicating a reception status of data and transmits or retransmits the data based on the response;
   a transmitter that transfers the data stored in the memory to a transfer destination; and
   a controller that inhibits transmission of the response transmitted to the transmission source, the response becoming a trigger that the transmission source transmits data to the communication apparatus, when a value pertaining to the data transfer to the transfer destination indicates a stop of data transmission of the transmission source,
   wherein the communication apparatus receives data from the transmission source using a first association of Stream Control Transmission Protocol (SCTP) established between the communication apparatus and the transmission source;
   when a length of period of time that transmission of the response is inhibited exceeds a threshold value, the controller establishes a second association, which is different from the first association, of SCTP between the communication device and the transmission source; and
   the controller receives data to be transferred to the transfer destination from the transmission source using the second association.

2. The communication apparatus according to claim 1, wherein the value pertaining to the data transfer to the transfer destination contains a value indicating a communication status with the transfer destination.

3. The communication apparatus according to claim 2, wherein the value indicating the communication status with the transfer destination contains a value pertaining to retransmission of the data to the transfer destination.

4. The communication apparatus according to claim 1, wherein the value pertaining to the data transfer to the transfer destination contains a data reception quantity from the transmission source.

5. The communication apparatus according to claim 1, wherein the value pertaining to the data transfer to the transfer destination contains at least one of a data quantity stored in the memory and a residual quantity enabling the memory to store data.

6. The communication apparatus according to claim 1, wherein the controller discards the response when the response transmitted to the transmission source indicates a request of data retransmission.

7. The communication apparatus according to claim 1, wherein the controller discards the response when the response transmitted to the transmission source prompts the communication apparatus to transmit non-transmitted data.

8. The communication apparatus according to claim 1, wherein the controller discards the response generated within a period of time for which transmission of the response to the transmission source is inhibited.

9. A communication apparatus, comprising:
a memory that stores data transmitted using a protocol that a transmission source receives a response indicating a reception status of data and transmits or retransmits the data based on the response;
a transmitter that transfers the data stored in the memory to a transfer destination; and
a controller that inhibits transmission of the response transmitted to the transmission source, the response becoming a trigger that the transmission source transmits data to the communication apparatus, when a value pertaining to the data transfer to the transfer destination indicates a stop of data transmission of the transmission source,
wherein the communication apparatus receives data from the transmission source using a first channel set in a first association of Stream Control Transmission Protocol (SCTP) established between the communication apparatus and the transmission source;
when a length of period of time that transmission of the response is inhibited exceeds a threshold value, the controller sets a second channel, which is different from the first channel, of SCTP in the first association; and
the controller receives data to be transferred to the transfer destination from the transmission source using the second channel.

10. A data relay method for a communication apparatus, the method comprising:
storing, by the communication apparatus, data transmitted using a protocol that a transmission source receives a response indicating a reception status of data and transmits or retransmits the data based on the response;
transferring, by the communication apparatus, the stored data to a transfer destination; and
inhibiting, using the communication apparatus, transmission of the response transmitted to the transmission source, the response becoming a trigger that the transmission source transmits data to the communication apparatus, when a value pertaining to the data transfer to the transfer destination indicates a stop of data transmission of the transmission source,
wherein the communication apparatus receives data from the transmission source using a first association of Stream Control Transmission Protocol (SCTP) established between the communication apparatus and the transmission source;
when a length of period of time that transmission of the response is inhibited exceeds a threshold value, the communication apparatus establishes a second association, which is different from the first association, of SCTP between the communication device and the transmission source; and
the communication apparatus receives data to be transferred to the transfer destination from the transmission source using the second association, or
wherein the communication apparatus receives data from the transmission source using a first channel set in a first association of Stream Control Transmission Protocol (SCTP) established between the communication apparatus and the transmission source;
when a length of period of time that transmission of the response is inhibited exceeds a threshold value, the communication apparatus sets a second channel, which is different from the first channel, of SCTP in the first association; and
the controller receives data to be transferred to the transfer destination from the transmission source using the second channel.

* * * * *